(12) United States Patent
Xu et al.

(10) Patent No.: US 12,200,749 B2
(45) Date of Patent: Jan. 14, 2025

(54) HANDLING OF MEASUREMENT GAP COLLISIONS

(71) Applicant: QUALCOMM Incorporated, San Diego, CA (US)

(72) Inventors: Huilin Xu, Temecula, CA (US); Seyedkianoush Hosseini, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/710,828

(22) Filed: Mar. 31, 2022

(65) Prior Publication Data
US 2023/0319865 A1 Oct. 5, 2023

(51) Int. Cl.
*H04W 72/542* (2023.01)
*H04W 72/0446* (2023.01)
*H04W 72/1263* (2023.01)
*H04W 72/23* (2023.01)
*H04W 72/56* (2023.01)

(52) U.S. Cl.
CPC ..... *H04W 72/542* (2023.01); *H04W 72/0446* (2013.01); *H04W 72/1263* (2013.01); *H04W 72/23* (2023.01); *H04W 72/56* (2023.01)

(58) Field of Classification Search
CPC ........... H04W 72/542; H04W 72/0446; H04W 72/1263; H04W 72/23; H04W 72/56; H04W 72/232; H04W 72/51
See application file for complete search history.

(56) References Cited

U.S. PATENT DOCUMENTS

| 2019/0364469 A1* | 11/2019 | Siomina | H04W 36/0085 |
| 2020/0288337 A1* | 9/2020 | Callender | H04W 24/10 |
| 2023/0171628 A1* | 6/2023 | Cui | H04W 24/10 370/252 |

FOREIGN PATENT DOCUMENTS

WO    WO-2009088944 A2 *   7/2009   ......... H04L 1/1854

* cited by examiner

*Primary Examiner* — Jianye Wu
(74) *Attorney, Agent, or Firm* — Holland & Hart / QUALCOMM Incorporated

(57) ABSTRACT

Methods, systems, and devices for wireless communications are described. A user equipment (UE) flexibly prioritize between communication resources and measurement gaps to resolve collisions between communication resources and measurement gaps. For collisions between a dynamically scheduled communication resources and a measurement gap, a UE may communicate using the scheduled communication resource based on at least one of a time between reception of the downlink control message and a start of the measurement gap satisfying a first threshold duration or a second period of time between reception of the downlink control message and a start of the communication resource satisfying a second threshold duration. For collisions between periodic communication resources and periodic measurement gaps, a UE may either perform a measurement during the measurement gap or communicate using the communication resource based on a priority scheme associated with the measurement gap and the periodically scheduled communication resource.

29 Claims, 19 Drawing Sheets

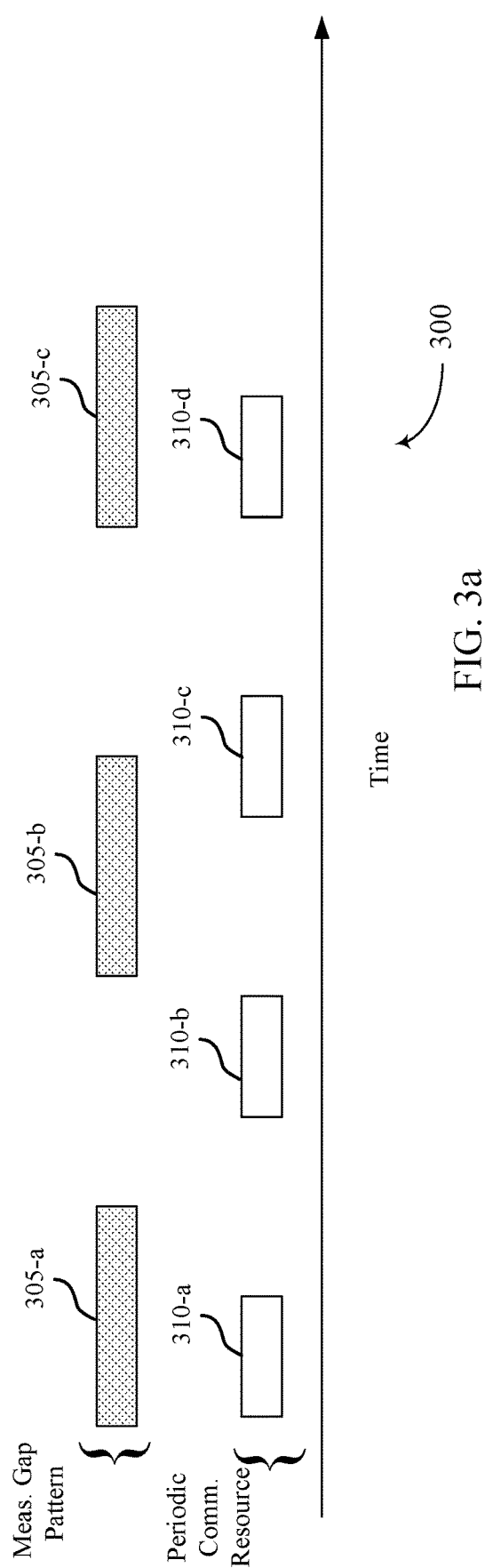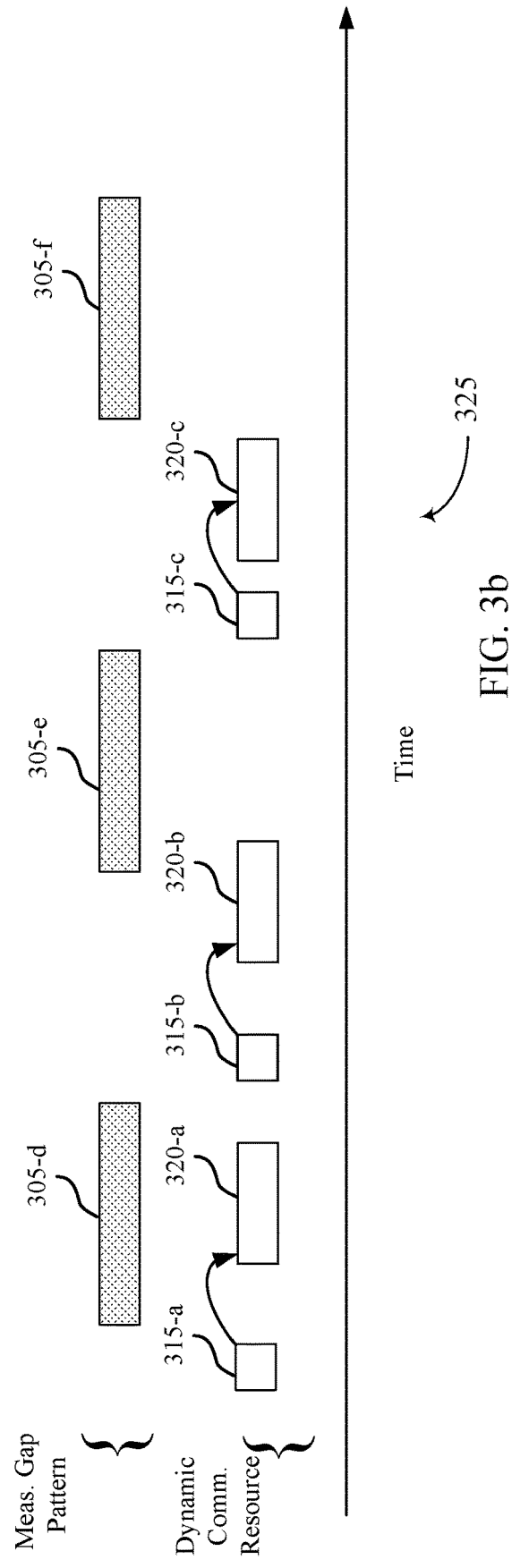
FIG. 3a
FIG. 3b

HANDLING OF MEASUREMENT GAP COLLISIONS

FIELD OF TECHNOLOGY

The following relates to wireless communications, including handling of measurement gap collisions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support handling of measurement gap collisions. For example, the described techniques provide for flexibly prioritize between communication resources and measurement gaps to resolve collisions between communication resources and measurement gaps. In some cases, a user equipment (UE) may receive control signaling configuring a measurement gap and a downlink control message scheduling a communication resource (e.g., a physical downlink shared channel (PDSCH) or a physical uplink shared channel (PUSCH)) that at least partially overlaps with the measurement gap. A communication resource scheduled by a downlink control message may be referred to as dynamically scheduled. The UE may communicate using the scheduled communication resource based on at least one of a time between reception of the downlink control message and a start of the measurement gap satisfying a first threshold duration or a second period of time between reception of the downlink control message and a start of the communication resource satisfying a second threshold duration. In some cases, a UE may receive first control signaling configuring a set of measurement gaps and second control signaling scheduling a set of periodic communication resources, where at least one measurement gap of the set of measurement gaps at least partially overlaps in time with a communication resource of the set of periodic communication resources. The UE may either perform a measurement during the measurement gap or communicate using the communication resource based on a priority scheme associated with the measurement gap and the periodically scheduled communication resource.

A method for wireless communications at a UE is described. The method may include receiving, from a network entity, control signaling configuring a measurement gap, receiving, from the network entity, a downlink control message scheduling a communication resource, where the communication resource at least partially overlaps in time with the measurement gap, and communicating using the communication resource based on at least one of a first period of time between reception of the downlink control message and a start of the measurement gap satisfying a first threshold duration or a second period of time between reception of the downlink control message and a start of the communication resource satisfying a second threshold duration.

An apparatus for wireless communications at a UE is described. The apparatus may include a processor, memory coupled with the processor, and instructions stored in the memory. The instructions may be executable by the processor to cause the apparatus to receive, from a network entity, control signaling configuring a measurement gap, receive, from the network entity, a downlink control message scheduling a communication resource, where the communication resource at least partially overlaps in time with the measurement gap, and communicate using the communication resource based on at least one of a first period of time between reception of the downlink control message and a start of the measurement gap satisfying a first threshold duration or a second period of time between reception of the downlink control message and a start of the communication resource satisfying a second threshold duration.

Another apparatus for wireless communications at a UE is described. The apparatus may include means for receiving, from a network entity, control signaling configuring a measurement gap, means for receiving, from the network entity, a downlink control message scheduling a communication resource, where the communication resource at least partially overlaps in time with the measurement gap, and means for communicating using the communication resource based on at least one of a first period of time between reception of the downlink control message and a start of the measurement gap satisfying a first threshold duration or a second period of time between reception of the downlink control message and a start of the communication resource satisfying a second threshold duration.

A non-transitory computer-readable medium storing code for wireless communications at a UE is described. The code may include instructions executable by a processor to receive, from a network entity, control signaling configuring a measurement gap, receive, from the network entity, a downlink control message scheduling a communication resource, where the communication resource at least partially overlaps in time with the measurement gap, and communicate using the communication resource based on at least one of a first period of time between reception of the downlink control message and a start of the measurement gap satisfying a first threshold duration or a second period of time between reception of the downlink control message and a start of the communication resource satisfying a second threshold duration.

Some examples of the method, apparatuses, and non-transitory computer-readable medium described herein may further include operations, features, means, or instructions for communicating using the communication resource may be based on the first period of time satisfying the first threshold duration.

Some examples of the method, apparatuses, and non-transitory computer-readable medium described herein may further include operations, features, means, or instructions for skipping an entirety of the measurement gap based on the first period of time satisfying the first threshold duration and the communication resource at least partially overlapping in time with the measurement gap.

Some examples of the method, apparatuses, and non-transitory computer-readable medium described herein may further include operations, features, means, or instructions for communicating using the communication resource may be based on the second period of time satisfying the second threshold duration.

Some examples of the method, apparatuses, and non-transitory computer-readable medium described herein may further include operations, features, means, or instructions for entering the measurement gap and canceling the measurement gap before completion based on the second period of time satisfying the second threshold duration and the communication resource at least partially overlapping in time with the measurement gap.

Some examples of the method, apparatuses, and non-transitory computer-readable medium described herein may further include operations, features, means, or instructions for transmitting, to the network entity, one of a capability message or a UE assistance information message indicating at least one of a first target time between associated downlink control messages and measurement gaps for the UE or a second target time between associated downlink control messages and downlink communication resources for the UE.

Some examples of the method, apparatuses, and non-transitory computer-readable medium described herein may further include operations, features, means, or instructions for receiving, from the network entity, second control signaling indicating at least one of the first threshold duration or the second threshold duration, where the second control signaling may be based on capability message or the UE assistance information message.

Some examples of the method, apparatuses, and non-transitory computer-readable medium described herein may further include operations, features, means, or instructions for receiving an indication of a first priority level associated with the measurement gap and receiving an indication of a second priority level associated with the communication resource, and where communicating using the communication resource may be based on the first priority level and the second priority level.

Some examples of the method, apparatuses, and non-transitory computer-readable medium described herein may further include operations, features, means, or instructions for receiving the indication of the first priority level via the control signaling.

Some examples of the method, apparatuses, and non-transitory computer-readable medium described herein may further include operations, features, means, or instructions for receiving the indication of the second priority level via the downlink control message.

Some examples of the method, apparatuses, and non-transitory computer-readable medium described herein may further include operations, features, means, or instructions for receiving, with the control signaling, an indication of a measurement associated with the measurement gap, where the first priority level may be based on the measurement.

In some examples of the method, apparatuses, and non-transitory computer-readable medium described herein, the second priority level may be based on a communication resource type of the communication resource.

In some examples of the method, apparatuses, and non-transitory computer-readable medium described herein, the downlink control message may be received via a first component carrier and the communication resource may be associated with a second component carrier and the downlink control message does not overlap or at least partially overlaps in time with the measurement gap.

In some examples of the method, apparatuses, and non-transitory computer-readable medium described herein, the downlink control message may be received via a component carrier and the communication resource may be associated with the component carrier and communicating using the communication resource based on receiving the downlink control message before the measurement gap.

In some examples of the method, apparatuses, and non-transitory computer-readable medium described herein, the communication resource may be a downlink communication resource and at least one of the first threshold duration or the second threshold duration may be based on at least one of a first target time between associated downlink control messages and measurement gaps for the UE or a second target time between associated downlink control messages and downlink communication resources for the UE.

In some examples of the method, apparatuses, and non-transitory computer-readable medium described herein, the communication resource may be a downlink communication resource and the second threshold duration may be based on a duration for the UE to tune radio frequency circuitry of the UE from the measurement gap to a bandwidth part associated with the downlink communication resource.

In some examples of the method, apparatuses, and non-transitory computer-readable medium described herein, the communication resource may be an uplink communication resource and at least one of the first threshold duration or the second threshold duration may be based on at least one of a first target time between associated downlink control messages and measurement gaps for the UE or a second target duration between associated downlink control messages and uplink communication resources for the UE.

In some examples of the method, apparatuses, and non-transitory computer-readable medium described herein, the communication resource may be an uplink communication resource and the first threshold duration or the second threshold duration may be based on a downlink control message processing time capability of the UE and an uplink shared channel message preparation time capability of the UE.

In some examples of the method, apparatuses, and non-transitory computer-readable medium described herein, the second threshold duration may be based on a duration for the UE to tune radio frequency circuitry of the UE from the measurement gap to a bandwidth part associated with the uplink communication resource.

A method for wireless communications at a UE is described. The method may include receiving, from a network entity, first control signaling configuring a set of measurement gaps, receiving, from the network entity, second control signaling scheduling a set of periodic communication resources, where a measurement gap of the set of measurement gaps at least partially overlaps in time with a communication resource of the set of periodic communication resources, and performing a measurement during the measurement gap or communicating using the communication resource based on a priority scheme associated with the set of measurement gaps and the set of periodic communication resources.

An apparatus for wireless communications at a UE is described. The apparatus may include a processor, memory coupled with the processor, and instructions stored in the memory. The instructions may be executable by the processor to cause the apparatus to receive, from a network entity, first control signaling configuring a set of measurement gaps, receive, from the network entity, second control signaling scheduling a set of periodic communication resources, where a measurement gap of the set of measurement gaps at least partially overlaps in time with a communication resource of the set of periodic communication resources, and perform a measurement during the measurement gap or communicating using the communication resource based on a priority scheme associated with the set of measurement gaps and the set of periodic communication resources.

Another apparatus for wireless communications at a UE is described. The apparatus may include means for receiving, from a network entity, first control signaling configuring a set of measurement gaps, means for receiving, from the network entity, second control signaling scheduling a set of periodic communication resources, where a measurement gap of the set of measurement gaps at least partially overlaps in time with a communication resource of the set of periodic communication resources, and means for performing a measurement during the measurement gap or communicating using the communication resource based on a priority scheme associated with the set of measurement gaps and the set of periodic communication resources.

A non-transitory computer-readable medium storing code for wireless communications at a UE is described. The code may include instructions executable by a processor to receive, from a network entity, first control signaling configuring a set of measurement gaps, receive, from the network entity, second control signaling scheduling a set of periodic communication resources, where a measurement gap of the set of measurement gaps at least partially overlaps in time with a communication resource of the set of periodic communication resources, and perform a measurement during the measurement gap or communicating using the communication resource based on a priority scheme associated with the set of measurement gaps and the set of periodic communication resources.

Some examples of the method, apparatuses, and non-transitory computer-readable medium described herein may further include operations, features, means, or instructions for receiving, from the network entity, an indication of the priority scheme.

Some examples of the method, apparatuses, and non-transitory computer-readable medium described herein may further include operations, features, means, or instructions for performing the measurement during the measurement gap based on the priority scheme assigning a higher priority level to the measurement gap than to the communication resource.

Some examples of the method, apparatuses, and non-transitory computer-readable medium described herein may further include operations, features, means, or instructions for communicating using the communication resource based on the priority scheme assigning a higher priority level to the communication resource that to the measurement gap.

In some examples of the method, apparatuses, and non-transitory computer-readable medium described herein, a priority level associated with the measurement gap may be based on a position of the measurement gap within the set of measurement gaps and the priority scheme may be based on the priority level.

Some examples of the method, apparatuses, and non-transitory computer-readable medium described herein may further include operations, features, means, or instructions for receiving, with the second control signaling, an indication of a priority level associated with the set of periodic communication resources, where the priority scheme may be based on the priority level.

In some examples of the method, apparatuses, and non-transitory computer-readable medium described herein, a priority level associated with the set of periodic communication resources may be based on a communication resource type of the set of periodic communication resources and the priority scheme may be based on the priority level.

Some examples of the method, apparatuses, and non-transitory computer-readable medium described herein may further include operations, features, means, or instructions for receiving, from the network entity, a downlink control message scheduling the communication resource, where the downlink control message indicates a priority level associated with the communication resource, and where the priority scheme may be based on the priority level.

Some examples of the method, apparatuses, and non-transitory computer-readable medium described herein may further include operations, features, means, or instructions for receiving, with the first control signaling, an indication of the measurement associated with the measurement gap of the set of measurement gaps, where a priority level associated with the measurement gap may be based on the measurement, and where the priority scheme may be based on the priority level.

BRIEF DESCRIPTION OF THE DRAWINGS

FIGS. 3a-3b illustrate examples of timing diagrams that supports handling of measurement gap collisions in accordance with one or more aspects of the present disclosure.

DETAILED DESCRIPTION

Figure 1:
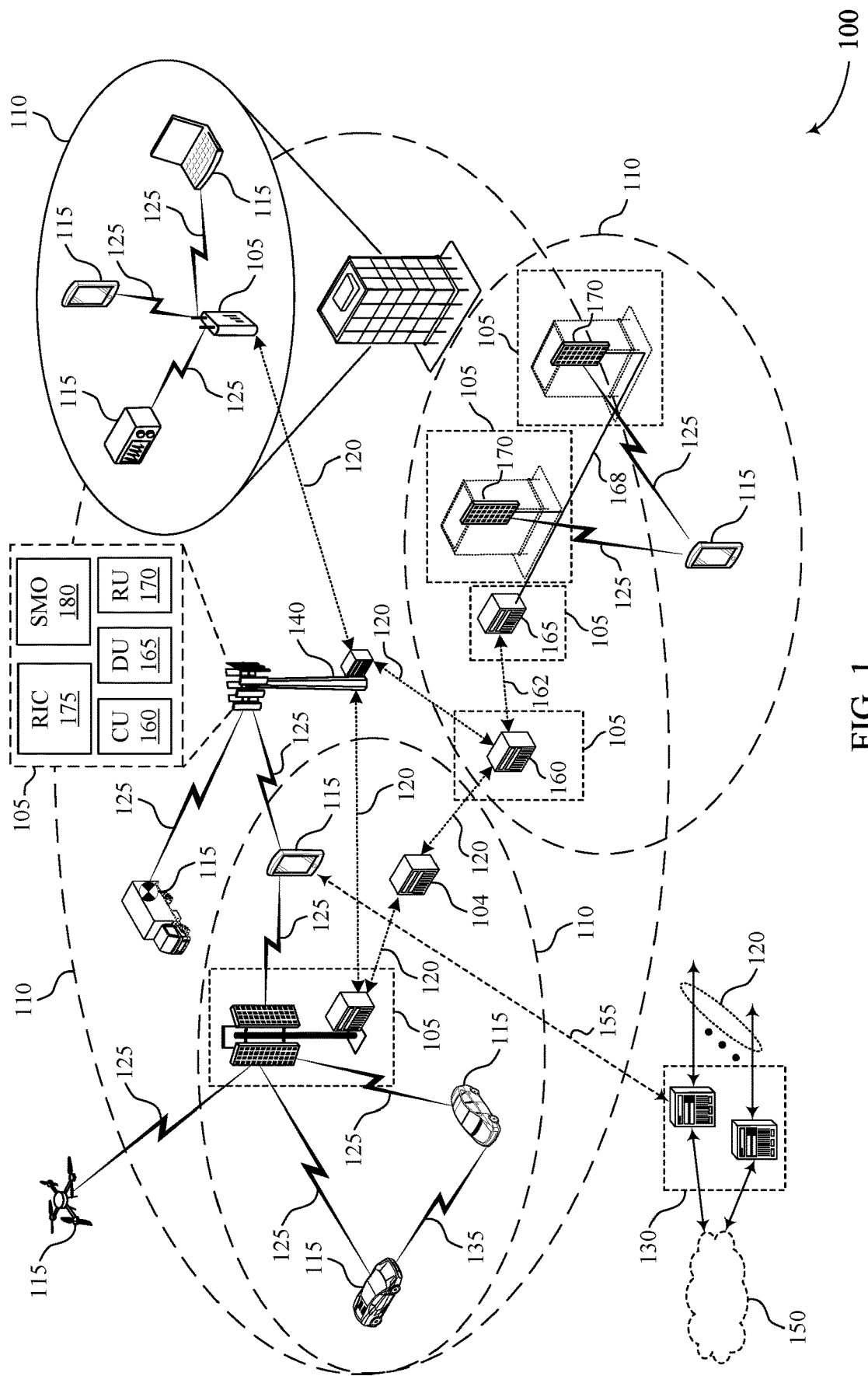
FIG. 1 illustrates an example of a wireless communications system that supports handling of measurement gap collisions in accordance with one or more aspects of the present disclosure.

In some wireless communications systems, the network may configure one or more measurement gaps for a user equipment (UE) to conduct one or more network measurements. For example, a UE may perform an inter-frequency or an inter-radio access technology (RAT) measurement during a measurement gap. A UE may not expect to transmit physical uplink control channel (PUCCH) messages, physical uplink shared channel (PUSCH) messages, or sounding reference signals (SRSs) during a measurement gap, and a UE may not expect to receive physical downlink control channel (PDCCH) messages, physical downlink shared channel (PDSCH) messages, or channel state information (CSI) reference signals (CSI-RS) during the measurement gap. For some wireless communication technologies (e.g., extended reality (XR)), the data or control frame periodicity may be different from the measurement gap periodicity.

The difference in periodicities of data or control communications and the measurement gap may result in collisions between a measurement gap and a data or control communication (e.g., a PUCCH message, a PUSCH message, a SRS, a PDCCH message, a PDSCH message, a CSI-RS). Thus, in some cases, a UE may be scheduled to transmit or receive a control or data message via a communication resource during a measurement gap when the UE does not expect to transmit or receive a control or data message. For periodically scheduled communication resources (e.g., communication resources scheduled according to configured grants, or semi-persistent scheduling, or persistent scheduling), some scheduled communication resources of the periodically scheduled communication resources may collide with scheduled measurement gaps. As used herein, a collision refers to at least a partial overlap in time (e.g., between scheduled communication resources and a scheduled measurement gap). One possible way to resolve collisions may be to semi-statically or semi-persistently prioritize control or data traffic or additional reference signal assisting communications service over the measurement gap. Such a resolution, however, may be inflexible and may favor either control or data traffic over a measurement gap.

In some examples, a UE may flexibly prioritize between communication resources and measurement gaps to resolve collisions between communication resources and measurement gaps. A UE may receive control signaling configuring a measurement gap and a downlink control message scheduling a communication resource (e.g., a PDSCH or a PUSCH) that at least partially overlaps with the measurement gap. The communication resource scheduled by a downlink control message may be referred to as dynamically scheduled. The UE may communicate using the scheduled communication resource based on at least one of a time between reception of the downlink control message and a start of the measurement gap satisfying a first threshold duration or a second period of time between reception of the downlink control message and a start of the communication resource satisfying a second threshold duration. For example, the UE may skip the measurement gap if a period of time between the reception of the scheduling downlink control message and the start of the measurement gap is greater than a first threshold duration. Skipping a measurement gap may refer to keeping radio frequency circuitry of the UE tuned to an active bandwidth part associated with the communication resource rather than tuning the radio frequency circuitry of the UE to the measurement gap. In other words, skipping a measurement gap may refer to the UE not entering the measurement gap. As another example, the UE may cancel a measurement gap if a period of time between the reception of the scheduling downlink control message and the start of the scheduled communication resource is greater than a second threshold duration. Canceling a measurement gap may refer to transitioning out of a measurement gap by tuning radio frequency circuitry of the UE from the measurement gap to the active bandwidth part associated with the communication resource. In other words, canceling a measurement gap may refer to the UE entering the measurement gap and returning to an active bandwidth part before a scheduled end of the measurement gap. The disclosed methods enable a UE to communicate using a communication resource that overlaps with a measurement gap by dynamically canceling or skipping the measurement gap based at least in part on the first threshold duration or the section threshold duration being satisfied (e.g., to allow sufficient time to process the downlink control message, tune radio frequency circuitry of the UE, and/or prepare communication resources). Accordingly, the disclosed methods may realize advantages relating to preventing the dropping of or retransmission of communication channels. Some messages may have strict latency targets, therefore enabling transmission of messages that would otherwise be canceled may enable a UE to meet the latency targets.

The first and second threshold durations may be associated with a processing time of the downlink control message. In some cases, the UE may transmit a capability message or a UE assistance information message indicating at least one of a first target time between associated downlink control messages and measurement gaps for the UE or a second target time between associated downlink control messages and downlink communication resources for the UE. For example, the first target time or the second target time may be based on a UE implementation and may be associated with a time associated with an ability of the UE to process a downlink control message and/or tune radio frequency circuitry of the UE from a measurement gap to an active bandwidth part or beam of a serving cell. In some cases, the network may transmit control signaling to the UE indicating at least one of the first threshold duration or the second threshold duration based on the first target time or the second target time reported by the UE to the network. In some cases, the network may set the first threshold duration equal to the first target time and/or the second threshold duration equal to the second target time. In some cases, the network may set the first threshold duration based on the first target time and one or more configured scheduling offsets and/or the second threshold duration based on the second target time and one or more configured scheduling offsets. Accordingly, the disclosed methods may realize advantages relating to configuring thresholds based on capabilities or information regarding a specific UE, which may lead to increased communications flexibility.

In some examples, whether to skip or cancel a measurement gap or to communicate using a dynamically scheduled communication resource may be based on a priority scheme associated with the measurement gap and the communication resource. For example, given measurements associated with a measurement gap may be associated with given priority levels and different communication resources may be associated with given priority levels. The UE may communicate using a dynamically scheduled communication resource or perform a measurement during the measurement gap based on the priority levels associated with the communication resource and the measurement. Accordingly, disclosed methods may enable a UE to determine whether to communicate using a communication resource or perform a measurement in a measurement gap based on which is associated with a higher priority for the UE.

In some examples, a UE may receive first control signaling configuring a set of measurement gaps and second control signaling scheduling a set of periodic communication resources, where at least one measurement gap of the set of measurement gaps at least partially overlaps in time with a communication resource of the set of periodic communication resources. The UE may either perform a measurement during the measurement gap or communicate using the communication resource based on a priority scheme associated with the measurement gap and the periodically scheduled communication resource. Accordingly, disclosed methods may enable a UE to determine whether to communicate using a communication resource or perform a measurement in a measurement gap based on which is associated with a higher priority for the UE.

In some examples, priority levels assigned to the periodically scheduled communication resource may depend on a type of communication resource (e.g., a PDSCH, PUSCH, PUCCH, PDCCH, CSI-RS, or SRS). In some examples, the priority levels assigned to the measurement gap may depend on a type of measurement associated with the measurement gap (e.g., for inter-frequency or inter-RAT measurements, beam measurements, or intra-frequency measurement when the UE's active bandwidth part does not contain a synchronization signal block (SSB)). Accordingly, a UE may resolve a collision between a periodically scheduled communication resource and a periodically scheduled measurement gap based on a communication resource type and/or a measurement type associated with the measurement gap.

Aspects of the disclosure are initially described in the context of wireless communications systems. Aspects of the disclosure are further illustrated by and described with reference to timing diagrams and process flows. Aspects of the disclosure are further illustrated by and described with reference to apparatus diagrams, system diagrams, and flowcharts that relate to handling of measurement gap collisions.

FIG. 1 illustrates an example of a wireless communications system 100 that supports handling of measurement gap collisions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support handling of measurement gap collisions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The network may configure one or more measurement gaps for a UE 115 to conduct one or more network measurements. For example, a UE 115 may perform an inter-frequency, an inter-RAT measurement, a beam measurement, or an intra-frequency measurement during a measurement gap. A UE 115 may not expect to transmit PUCCH messages, PUSCH messages, or SRSs during a measurement gap, and a UE may not expect to receive PDCCH messages, or PDSCH messages during the measurement gap (except for transmission and reception activities related to random access channel (RACH) procedures). In some cases, a UE 115 may not expect to receive CSI-RSs during a measurement gap. In some examples, a UE 115 may report prior measured CSI to the network for a CSI-RS that collides with a measurement gap.

For some wireless communications technologies, data or control communications traffic (e.g., PUCCH, PUSCH, PDCCH, PDSCH, SRS, CSI-RS), can be aligned with a measurement gap pattern to prevent collisions. For some wireless communication technologies (e.g., XR), the data or control frame periodicity may be different from the measurement gap pattern periodicity (e.g., due to latency requirements of the given wireless communication technology and XR video frame rate). For example, a measurement gap periodicity may be 20 ms, 40 ms, 80 ms, or 160 ms, and may be designed to match with synchronization signal block (SSB) periodicity or SSB based measurement timing configuration (SMTC) window. XR traffic may have a typical frame rate of 30, 45, 60, 90, and 120 frames per second, which corresponds to a frame periodicity of 33.33 ms, 22.22 ms, 16.66 ms, 11.11 ms, and 8.33 ms, respectively. Accordingly, collisions between measurement gaps and some wireless communication technology data or control communications (e.g., XR), may not be avoided by adjusting the offset of the measurement gap or the offset of the data or control communications.

Some wireless communications technologies may have strict latency targets for data and control communications (e.g., XR may have a packet delay budget (PDB) of 10 ms). Collisions between measurement gaps and data or control communications may impact latency performance as the UE 115 may not transmit or receive data or control communications during a measurement gap. For example, a measurement gap may be configured with a length between 1.5 and 6 ms, and in some cases a UE 115 may abandon an entire data frame or control information that collides with a measurement gap. One possible way to resolve collisions may be to semi-statically or semi-persistently prioritize control or data traffic or additional reference signal assisting communications service over the measurement gap. Such a resolution, however, may be inflexible and may favor either control or data traffic over a measurement gap.

In some examples, a UE 115 may flexibly prioritize between communication resources and measurement gaps to resolve collisions between communication resources and measurement gaps. A UE 115 may receive control signaling configuring a measurement gap and a downlink control message scheduling a communication resource (e.g., a PDSCH or a PUSCH) that at least partially overlaps with the measurement gap. The UE 115 may communicate using the scheduled communication resource based on at least one of a time between reception of the downlink control message and a start of the measurement gap satisfying a first threshold duration or a second period of time between reception of the downlink control message and a start of the communication resource satisfying a second threshold duration. For example, the UE 115 may skip the measurement gap if a period of time between the end of the scheduling downlink control message and the start of the measurement gap is greater than a first threshold duration. As another example, the UE 115 may cancel a measurement gap if a period of time between the end of the scheduling downlink control message and the start of the scheduled communication resource is greater than a second threshold duration. Accordingly, a UE 115 may communicate using a communication resource that overlaps with a measurement gap by dynamically canceling or skipping the measurement gap if the UE 115 has sufficient time to process the downlink control message, tune radio frequency circuitry of the UE 115, and/or prepare communication resources. Accordingly, the disclosed methods may realize advantages relating to preventing the dropping of or retransmission of communication channels and thereby decrease latency.

The first and second threshold durations may be associated with a processing time of the downlink control message. In some examples, whether to skip or cancel a measurement gap or to communicate using a dynamically scheduled communication resource may be based on a priority scheme associated with the measurement gap and the communication resource. For example, given measurements associated with a measurement gap may be associated with given priority levels and different communication resources may be associated with given priority levels. The UE 115 may communicate using a dynamically scheduled communication resource or perform a measurement during the measurement gap based on the priority levels associated with the communication resource and the measurement. Accordingly, a UE 115 may determine whether to communicate using a communication resource or perform a measurement in a measurement gap based on which is associated with a higher priority for the UE 115.

In some examples, a UE 115 may receive first control signaling configuring a set of measurement gaps and second control signaling scheduling a set of periodic communication resources, where at least one measurement gap of the set of measurement gaps at least partially overlaps in time with a communication resource of the set of periodic communication resources. The UE 115 may either perform a measurement during the measurement gap or communicate using the communication resource based on a priority scheme associated with the measurement gap and the periodically scheduled communication resource. A UE 115 may determine whether to communicate using a communication resource or perform a measurement in a measurement gap based on which is associated with a higher priority for the UE 115.

In some examples, priority levels assigned to the periodically scheduled communication resource may depend on a type of communication resource (e.g., a PDSCH, PUSCH, PUCCH, PDCCH, CSI-RS, or SRS). In some examples, the priority levels assigned to the measurement gap may depend on a type of measurement associated with the measurement gap (e.g., for inter-frequency or inter-RAT measurements, beam measurements, or intra-frequency measurement when the UE 115's active bandwidth part does not contain a synchronization signal block (SSB)). Accordingly, a UE 115 may resolve a collision between a periodically scheduled communication resource and a periodically scheduled measurement gap based on a communication resource type and/or a measurement type associated with the measurement gap.

Figure 2:
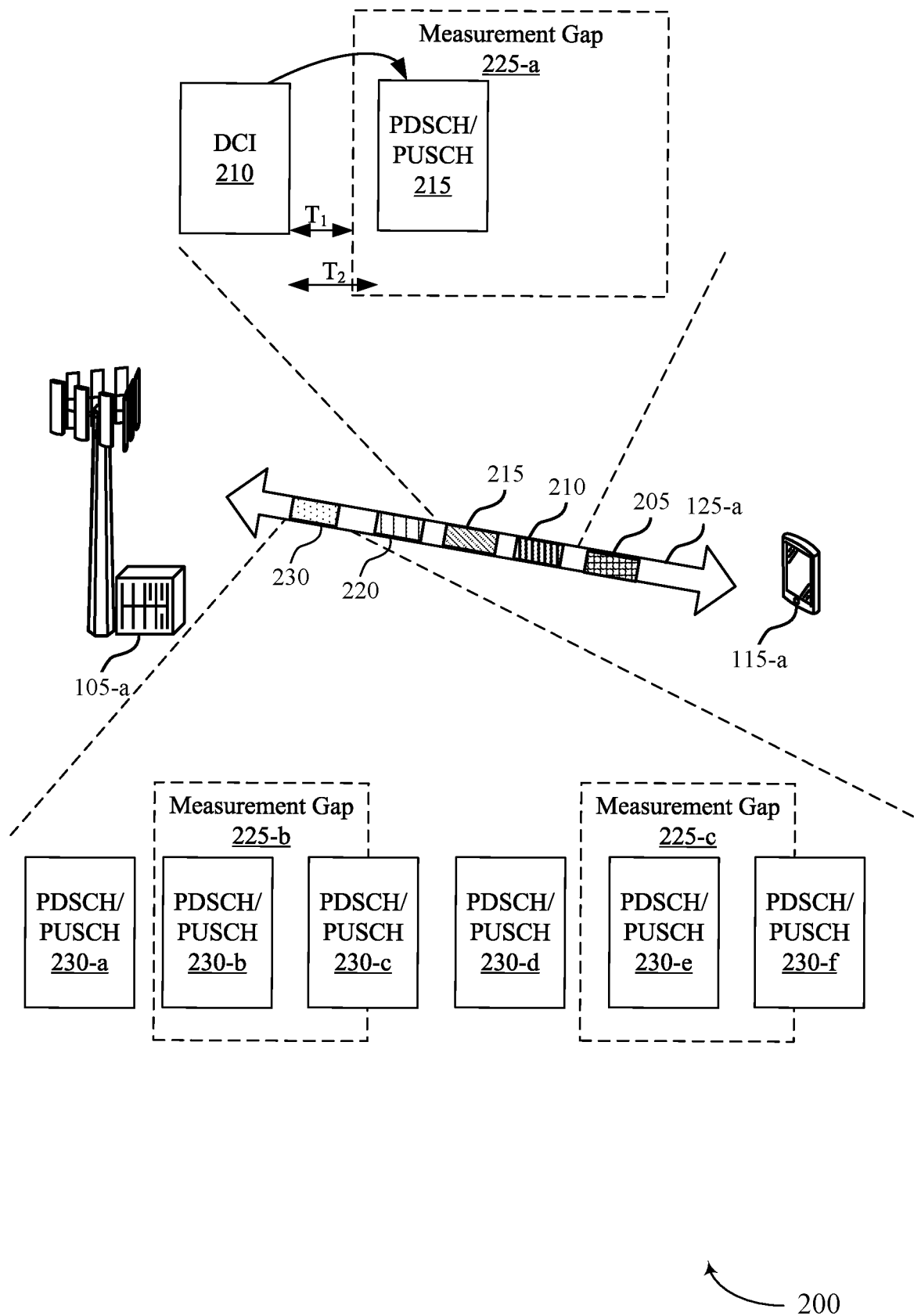
FIG. 2 illustrates an example of a wireless communications system that supports handling of measurement gap collisions in accordance with one or more aspects of the present disclosure.
Figure 4A:
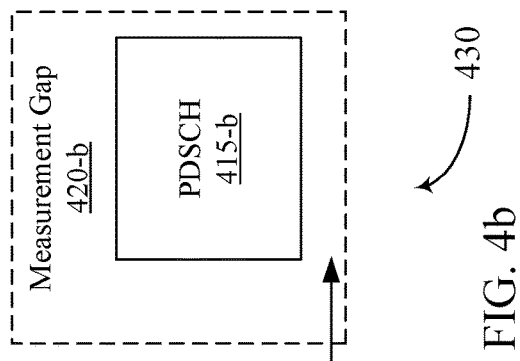
FIGS. 4a-4d illustrate examples of timing diagrams that supports handling of measurement gap collisions in accordance with one or more aspects of the present disclosure.
Figure 4B:
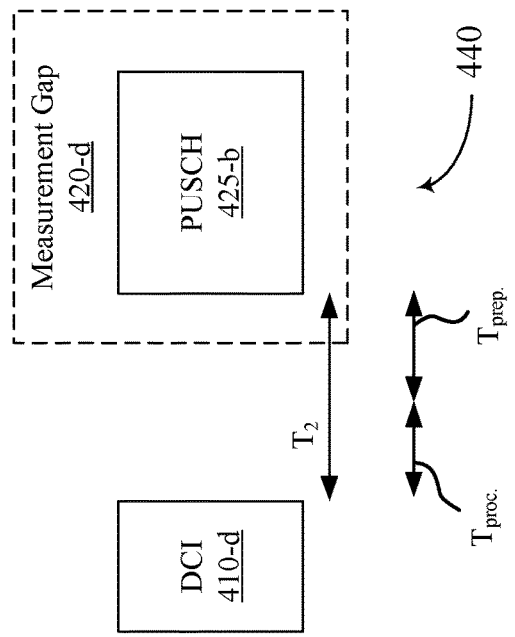
Figure 4C:
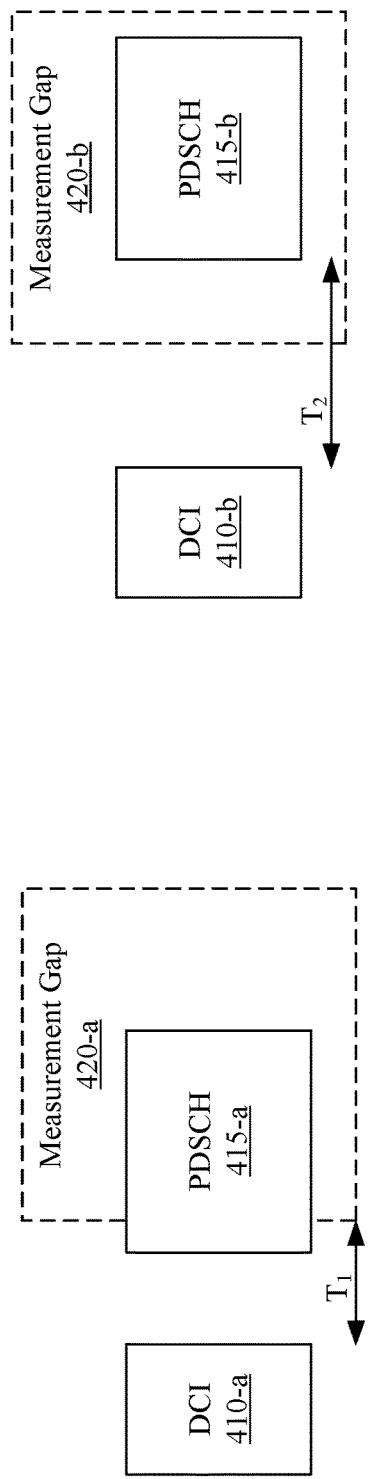
Figure 4D:
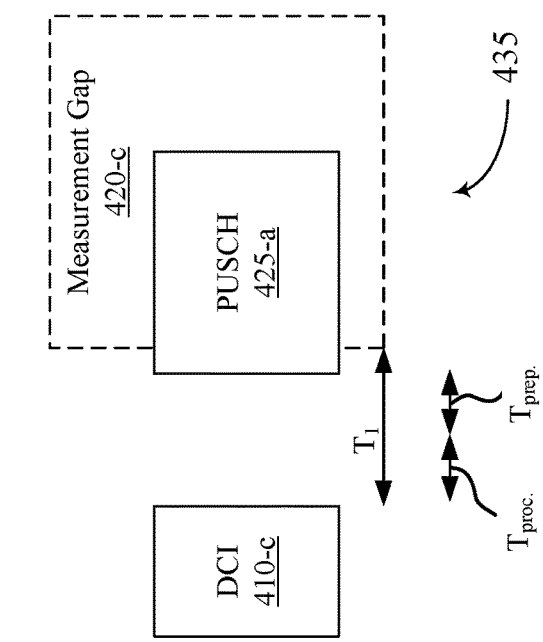

FIG. 2 illustrates an example of a wireless communications system 200 that supports handling of measurement gap collisions in accordance with one or more aspects of the present disclosure. In some examples, the wireless communications system 200 may implement aspects of wireless communications system 100. The wireless communications system 200 may include a UE 115-a, which may be an example of a UE 115 as described herein. The wireless communications system 200 may include a network entity 105-a, which may be an example of a network entity 105 as described herein.

The UE 115-a may communicate with the network entity 105-a using a communication link 125-a, which may be examples of NR or LTE links between the UE 115-a and the network entity 105-a. The communication link 125-a may include bi-directional links that enable both uplink and downlink communication. For example, the UE 115-a may transmit uplink signals, such as uplink control signals or uplink data signals, to the network entity 105-a using the communication link 125-a and the network entity 105-a may transmit downlink transmissions, such as downlink control signals or downlink data signals, to the UE 115-a using the communication link 125-a.

The UE 115-a may receive control signaling 205 configuring a measurement gap 225-a. In some cases, the control signaling 205 may configure a measurement gap pattern (e.g., a set of periodic measurement gaps 225-a). In some cases, the UE 115-a may receive a downlink control message 210 scheduling a communication resource 215 (e.g., a PDSCH message or a PUSCH message). The communication resource 215 may overlap in time (e.g., collide with) the measurement gap 225-a. The UE 115-a may communicate using the communication resource 215 based on at least one of a time $T_1$ between the end of the downlink control message 210 and a start of the measurement gap 225-a satisfying a first threshold duration or a second period of time $T_2$ between the end of the downlink control message 210 and a start of the communication resource 215 satisfying a second threshold duration. For example, the UE 115-a may skip the measurement gap 225-a if a period of time $T_1$ between the end of the scheduling downlink control message 210 and the start of the measurement gap 225-a is greater than a first threshold duration. As another example, the UE 115-a may cancel the measurement gap 225-a if a period of time $T_2$ between the end of the downlink control message 210 and the start of the communication resource 215 is greater than a second threshold duration.

In some cases, the control signaling 205 may configure a measurement gap pattern (e.g., a set of periodic measurement gaps 225 including measurement gap 225-b and measurement gap 225-c). The UE 115-a may receive second control signaling 220 scheduling a set of periodic communication resources 230. Some of the periodic communication resources 230 (e.g., communication resource 230-b, communication resource 230-c, communication resource 230-e, and communication resource 230-f) may collide with (e.g., at least partially overlap in time with) the measurement gap 225-b and the measurement gap 225-c. For each collision, the UE 115-a may either perform a measurement during the measurement gap (e.g., measurement gap 225-b or measurement gap 225-c) or communicate using the communication resource (e.g., communication resource 230-b, communication resource 230-c, communication resource 230-e, and communication resource 230-f) based on a priority scheme associated with the respective measurement gap 225 and the respective communication resource 230.

FIG. 3a illustrates an example of a timing diagram 300 that supports handling of measurement gap collisions in accordance with one or more aspects of the present disclosure. In some examples, the timing diagram 300 may implement aspects of wireless communications systems 100 or 200.

As described herein, a UE 115 may be configured with higher layer resources (e.g., periodic or semi-persistent scheduled (SPS) communication resources 310) and a periodic measurement gaps 305. A UE 115 may prioritize between overlapping communication resources 310 and measurement gaps 305 as the UE 115 may identify and resolve collisions based on a priority scheme. For example, a communication resource 310-a may collide with a measurement gap 305-a, a communication resource 310-c may collide with a measurement gap 305-b, and a communication resource 310-d may collide with a measurement gap 305-c. Accordingly, a UE 115 may prioritize between measurement gaps 305 and periodic communication resources 310 (e.g., PUCCH, configured grant (CG) PUSCH, PDCCH, SPS PDSCH, periodic or SPS SRS, or periodic or SPS CSI-RS). Prioritizing between measurements in the measurement gaps 305 and the periodic communication resources may result in a performance tradeoff between measurement accuracy and communications throughput depending on whether the serving cell channel and signal (e.g., the communication resource 310) or the measurement gap 305 is prioritized.

FIG. 3b illustrates an example of a timing diagram 325 that supports handling of measurement gap collisions in accordance with one or more aspects of the present disclosure. In some examples, the timing diagram 325 may implement aspects of wireless communications systems 100 or 200.

A UE 115 may receive downlink control messages 315 dynamically scheduling communication resources 320 (e.g., PDSCH or PUSCH messages). Dynamically scheduled communication resources 310 may collide with periodically scheduled measurement gaps 305. For example, a communication resource 320-a scheduled by a downlink control message 315-a may collide with a measurement gap 305-d and a communication resource 320-b scheduled by a downlink control message 315-b may collide with a measurement gap 305-e.

Prioritizing between dynamically scheduled communication resources 310 and measurement gaps 305 may be more challenging than prioritizing between periodic communication resources 310 (as shown in FIG. 3a) and measurement gaps 305 because whether the UE 115 should perform a measurement during the measurement gap or operate with the serving cell channel or signal (using the communication resource) may be dynamically determined based on a PDCCH decoding result by the UE 115 of the scheduling or triggering downlink control message 315 (e.g., a downlink control information message). Ins some examples, the downlink control message 315 may be a self-scheduling downlink control information (DCI) transmitted on the serving cell or a cross-carrier scheduling DCI transmitted on the scheduling cell to schedule or trigger channel or signal which may collide with measurement gap on another cell.

FIGS. 4a, 4b, 4c, and 4d illustrate examples of timing diagrams 400, 430, 435, and 440, respectively that support handling of measurement gap collisions in accordance with one or more aspects of the present disclosure. In some examples, the timing diagrams 400, 430, 435, and 440 may implement aspects of wireless communications systems 100 or 200.

Dynamically prioritizing downlink control message (e.g., DCI received via a PDCCH) scheduled PDSCH (or other downlink communication resource) based on the scheduling downlink control message may be associated with several timing constraints. For example, there may be a minimum PDCCH processing time for a UE 115 to complete decoding a downlink control message (e.g., DCI 410-a or DCI 410-b) before the start of the scheduled PDSCH (e.g., PDSCH 415-a or PDSCH 415-b). However, the minimum PDCCH processing time may not be a sufficient period of time for a UE 115 to decode a scheduling DCI 410, determine that the scheduled PDSCH (e.g., PDSCH 415-a or PDSCH 415-b) overlaps with a measurement gap 420, tune radio frequency circuitry of the UE 115 back to the serving cell, and receive the PDSCH (e.g., PDSCH 415-a or PDSCH 415-b). This is because the UE 115 may take additional time to tune back to the active bandwidth part (BWP) or beam associated with the scheduled PDSCH 415-a or PDSCH 415-b.

$T_{proc,1}$ may refer to the minimum timing offset between the end of a PDSCH 415 and the start of a corresponding HARQ acknowledgment transmission. In some cases, a timing relationship between a PDSCH 415 and a scheduling DCI 410 (conveyed via a PDCCH) may be constrained by a condition that a scheduled PDSCH 415 may start no earlier than two symbols before the start of the scheduling PDCCH. A minimum processing time for a UE 115 to decode PDCCH conveying a DCI 410 may be included in the total PDSCH processing time, $T_{proc,1}$, which may indirectly demand a UE to decode a PDCCH conveying a DCI 410 scheduling a PDSCH 415 fast enough so that the UE 115 may decode the PDSCH 415 and generate the HARQ acknowledgment report within the target $T_{proc,1}$.

In some examples, a minimum downlink scheduling offset for cross-carrier scheduling with different subcarrier spacings (SCSs) may constrain the minimum time between a DCI 410 scheduling a PDSCH 415. In some cases, a minimum time for same SCS cross-carrier scheduling or for same carrier scheduling may not be defined. The minimum downlink scheduling offset for cross-carrier scheduling with different SCS may be defined to reduce excessive PDSCH sample buffering caused by the different SCSs between scheduling and scheduled carriers. The minimum scheduling offset may not be long enough for a UE 115 to finish PDCCH decoding before a scheduled PDSCH 415. Accordingly, the scheduling offset for cross-carrier scheduling with different SCSs may not directly define a timeline condition for dynamic measurement gap skipping or cancellation.

A minimum scheduling offset $K_{0min}$ for cross-slot scheduling may be defined (e.g., a UE 115 may not expect to be scheduled a PDSCH 415 with slot offset $K_0$ smaller than the currently active $K_{0min}$). Slot offset K0 may refer an offset between a slot where the PDCCH (DCI) is received and the slot where PDSCH is scheduled. In some examples, after a UE 115 captures PDCCH samples, the UE 115 may enter a sleep mode (if there are no scheduled communications between the PDCCH and a target instant indicated by $K_{0min}$), decode the DCI 410 conveyed by the PDCCH, and wake up from the sleep mode to capture PDSCH 415 samples scheduled by the DCI 410. The UE 115 may be able to finish PDCCH decoding within the duration based on $K_{0min}$. Accordingly, a configured $K_{0min}$ may be used as a baseline design for dynamic measurement gap skipping or cancellation. In some examples, an additional time duration may be added for the tuning back time (e.g., for tuning radio frequency circuitry of the UE 115 back to a serving cell after entry into a measurement gap).

For dynamically scheduled PUSCH 425 transmissions, a minimum scheduling offset $T_{proc,2}$ between the end of the PDCCH conveying the DCI 410 scheduling the PUSCH 425 and the start of the scheduled PUSCH 425 may be defined. $T_{proc,2}$ may be reused for a minimum scheduling offset for a UE 115 to skip or cancel the measurement gap 420 if a dynamically scheduled PUSCH 425 overlaps with the measurement gap 420. $T_{proc,2}$ may account for both the PDCCH decoding time (shown as $T_{proc}$) and the PUSCH preparation time (shown as $T_{prep}$) Accordingly, using a configured $T_{proc,2}$ as a minimum scheduling offset for a UE 115 to skip or cancel the measurement gap 420 if a dynamically scheduled PUSCH 425 overlaps with the measurement gap 420 may guarantee that the UE 115 has sufficient time to finish PDCCH decoding. The addition PUSCH preparation time budget ($T_{prep}$) may be long enough for the UE 115 to tune back to a serving active BWP of the UE 115 or beam when a PUSCH 425 is being prepared (e.g., if tuning time is less than $T_{prep}$). $T_{proc,2}$, however, does not separately define $T_{prep}$ and $T_{proc}$. Accordingly for the worst case, depending on a UE capability, assume that the PDCCH decoding time (T 1 may be the proc, same as $T_{proc,2}$. In such cases, additional time may be added to determine the measurement gap skipping or cancellation timeline.

In some cases, other uplink related scheduling timeline criteria may be reused for the minimum timing offset for a UE 115 to skip or cancel the measurement gap when the scheduled uplink transmission (e.g., a PUSCH 425) overlaps with a measurement gap 420. For example, a minimum $K_2$ timeline for cross-slot scheduling may be used. For example, a UE 115 may not except to be scheduled a PUSCH 425 with a slot offset $K_2$ smaller than a currently active $K_2$ ($K_2$ min). In some cases, a UE 115 may enter a micro-sleep mode after capturing samples of the PDCCH conveying a DCI 410 until some time (e.g., which may depend on the UE 115 implementation) before the start of the PUSCH 425 to start preparing the PUSCH 425 according to the scheduling information in the DCI 410 conveyed by the PUCCH.

In some cases, a minimum timing offset $T_{proc,2+d1}$ may be reused for the minimum timing offset for a UE 115 to skip or cancel the measurement gap when the scheduled uplink transmission (e.g., a PUSCH 425) overlaps with a measurement gap 420. $T_{proc,2+d1}$ may be a timing offset for the cancellation of a low priority PUSCH 425 by a higher priority uplink transmission. The cancellation may start at $T_{proc,2+d1}$ after the end of the PDCCH conveying the DCI 410 scheduling the canceled PUSCH 425. D1 $\in\{0,1,2\}$, may be reported to the network as a capability of the UE 115.

In some cases, an uplink cancelation may be triggered by a DCI format 2_4. For a cancelation triggered by DCI format 2_4 to take effect, the cancellation may start at a time offset $T_{proc,2+d}$ between the end of PDCCH reception of the scheduling DCI 410 to the first symbol where cancellation take effects. To calculate $T_{proc,2+d}$, $d_{2,1}=0$, $N_2$ of minimum processing capability 2 is assumed (even for a capability 1 UE 115), and $d\in\{0,1,2\}$ may be reported to the network as a capability of the UE 115.

In some cases, a minimum aperiodic SRS antenna switching timeline may be reused for the minimum timing offset for a UE 115 to skip or cancel the measurement gap when the scheduled uplink transmission (e.g., a PUSCH 425) overlaps with a measurement gap 420.

It may be preferable to define the switching timing offset such that the UE 115 may dynamically skip or cancel a measurement gap 420. In some cases, a UE 115 may skip a measurement gap 420 (measurement gap 420-a or the measurement gap 420-c) that overlaps with a communication resource (e.g., a PDSCH 415-a or a PUSCH 425-a) if timing offset $T_1$ between the end of the PDCCH conveying the DCI 410-a or the DCI 410-c scheduling the communication resource (e.g., a PDSCH 415-a or a PUSCH 425-a) and the start of the measurement gap 420-a or the measurement gap 420-c is not less than a first threshold duration. In this case, the UE 115 should have enough time to finish the PDCCH decoding to know that the scheduled communication resource (e.g., a PDSCH 415-a or a PUSCH 425-a) overlaps with the measurement gap 420 (measurement gap 420-a or the measurement gap 420-c) before the measurement gap starts. The UE 115 may not tune the radio frequency or beam of the UE 115 either into or out of the measurement gap 420. In some cases, The UE 115 may not expect to receive a PDCCH conveying a DCI 410 that schedules a communication resource (e.g., a PDSCH 415-a or a PUSCH 425-a) overlapping with a measurement gap 420 if a timing offset $T_1$ between the end of the PDCCH and start of the measurement gap 420 is smaller than the first threshold duration.

In some cases, a UE 115 may cancel the measurement gap 420 (measurement gap 420-b or the measurement gap 420-d) that overlaps with a communication resource (e.g., a PDSCH 415-b or a PUSCH 425-b) if timing offset $T_2$ between the end of the PDCCH conveying the DCI 410-b or the DCI 410-d scheduling the communication resource (e.g., a PDSCH 415-b or a PUSCH 425-b) and the start of the communication resource (e.g., a PDSCH 415-b or a PUSCH 425-b) is not less than a second threshold duration. In this case, the UE 115 may have already entered the measurement gap 420 when the UE 115 finishes decoding the PDCCH conveying the scheduling DCI 410, and the UE 115 may know that the scheduled communication resource (e.g., a PDSCH 415-b or a PUSCH 425-b) overlaps with the measurement gap 420. The UE 115 may tune the radio frequency or beam of the UE 115 back to the active BWP or beam on the serving cell which could take additional time. The UE 115 may not expect to receive a PDCCH conveying a DCI 410 that schedules a communication resource (e.g., a PDSCH 415-b or a PUSCH 425-b) overlapping with the measurement gap 420 if a timing offset $T_2$ between the end of the PDCCH and start of the communication resource (e.g., a PDSCH 415-b or a PUSCH 425-b) is smaller than the second threshold duration. Implementing the second threshold duration may be more difficult than implementing the first threshold duration for a UE 115, but implementing the second threshold duration may provide more scheduling flexibility.

Both the first threshold duration and the second threshold duration may apply to the reception of dynamically scheduled PDSCH 415, dynamically triggered CSI-RS, dynamically scheduled PUSCH 425, and aperiodic SRS. In some cases, the first threshold duration may be different for uplink (e.g., dynamically scheduled PUSCH 425, and aperiodic SRS) and for downlink (e.g., dynamically scheduled PDSCH 415, dynamically triggered CSI-RS). In some cases, the second threshold duration may be different for uplink (e.g., dynamically scheduled PUSCH 425, and aperiodic SRS) and for downlink (e.g., dynamically scheduled PDSCH 415, dynamically triggered CSI-RS). In some cases, a UE 115 may implement both the first threshold duration and the second threshold duration.

In some cases, where the PDCCH conveying the scheduling DCI 410 is received on same the cell as that of the scheduled communication resource (e.g., a PDSCH 415 or a PUSCH 425), all symbols of the PDCCH conveying the scheduling DCI 410 may be received before measurement gap 420. For cross-carrier scheduling, where a PDCCH conveying the scheduling DCI 410 is received on a different cell from that of the scheduled communication resource (e.g., a PDSCH 415 or a PUSCH 425), symbols of the PDCCH conveying the scheduling DCI 410 may overlap in time with the measurement gap 420 on the scheduled cell for the measurement gap cancellation case (e.g., where the second threshold duration is implemented).

In some cases, for a dynamically scheduled downlink communication resource (e.g., a PDSCH 415) on the serving cell where measurement gap 420 is configured, a UE 115 may perform the reception of the communication resource (e.g., a PDSCH 415) even if the communication resource overlaps with the measurement gap 420 if the timing offset for measurement gap skipping $T_{1,d}$ satisfies the first threshold duration or the timing offset for measurement gap cancellation $T_{2,d}$ satisfies the second threshold duration. In some cases, the first or second threshold duration may be given by a minimum scheduling offset $K_{0min}$ for cross-slot scheduling (a UE 115 may not expect to be scheduled a PDSCH 415 with slot offset $K_0$ smaller than the currently active minimum $K_0$). In some cases, the first or second threshold duration may be given by a new value separately defined for the handling of a collision with a measurement gap 420 (e.g., which may be configured by the network via signaling). In some cases, the first or second threshold duration may be based on $K_{0min}$ plus an additional offset value.

In some cases, for measurement gap cancellation (e.g., implementation of the second threshold duration), an additional time duration $\delta_D$ may be added to $T_{2,d}$ to account for the radio frequency tuning time out of the measurement gap 420 and back to the active BWP or beam on the serving cell for the UE 115. For example, $\delta_D$=0.5 ms may be added to $T_{2,d}$, and then $T_{2,d}$ is larger than $T_{1,d}$.

In some cases, for a dynamically scheduled uplink communication resource (e.g., a PUSCH 425) on the serving cell where measurement gap 420 is configured, a UE 115 may perform the reception of the communication resource (e.g., a PUSCH 425) even if the communication resource overlaps with the measurement gap 420 if the timing offset for measurement gap skipping $T_{1,u}$ satisfies the first threshold duration or the timing offset for measurement gap cancellation $T_{2,u}$ satisfies the second threshold duration. In some cases, the first or second threshold duration may be given by the minimum scheduling offset $T_{proc,2}$ between the end of the PDCCH conveying the scheduling DCI 410 and the start of the scheduled PUSCH 425. In some cases, the first or second threshold duration may be given by the minimum $K_2$ timeline $K_2$ min for cross-slot scheduling for uplink communications. For example, the UE 115 may not expect to be scheduled a PUSCH 425 with the slot offset $K_2$ smaller than the currently active $K_2$. In some cases, the first or second threshold duration may be given by the minimum timing offset $T_{proc,2+d1}$ that has been defined for the cancellation of a low priority PUSCH by a higher priority uplink channel. In some cases, the first or second threshold duration may be given by the minimum timing offset $T_{proc,2+d}$ for the uplink cancellation indication in a PDCCH carrying DCI format 2_4 to take effect. In some cases, the first or second threshold duration may be given by a minimum aperiodic SRS antenna switching time. In some cases, the first or second threshold duration may be given by a new value separately defined for the handling of a collision with a measurement gap 420 (e.g., which may be configured by the network). In some cases, the first or second threshold duration may be based on any of the options provided herein plus an additional offset value.

In some cases, for measurement gap cancellation (e.g., implementation of the second threshold duration), an additional time duration $\delta_U$ may be added to $T_{2,U}$ to account for the radio frequency tuning time out of the measurement gap 420 and back to the active BWP or beam on the serving cell for the UE 115 in case the tuning time is longer than the PUSCH preparation time $T_{prep}$. For example, $\delta_U$=0.5 ms may be added to $T_{2,u}$, and then $T_{2,d}$ is larger than $T_{1,u}$.

In some cases, skipping or cancelation decisions may be based on a type of communication resource. For example, a priority may be defined for measurement gaps 420 and for different communication resources (e.g., dynamically scheduled channel or dynamically triggered signal including a dynamic grant PDSCH, dynamic grant PUSCH, aperiodic SRS, and aperiodic CSI-RS may each have an assigned priority level). A dynamically scheduled channel or dynamically triggered signal may also include a first SPS, CG occasion activated by PDCCH, the first PDSCH of multiple PDSCHs on the same SPS occasion indicated by one DCI (e.g., to indicate the arrival time and number of PDSCHs on the SPS occasion), the first PDSCH or PUSCH of multiple PDSCHs or PUSCHs scheduled by the same scheduling PDCCH, or the like. The UE 115 may perform dynamic collision handling depending on their priority and priority of the measurement gap. For example, a UE 115 may skip a measurement gap if the channel or signal has higher priority, and capabilities may be separate for downlink and uplink.

When a collision occurs, the UE 115 may decide to skip or cancel the measurement gap 420 or to skip the communication resource based on a comparison of the respective priority levels. In some cases, PUCCH may be higher priority than PUSCH, and PDCCH may be higher priority than PDSCH. In some cases, different levels of priority may be defined based on what is carried in a PUCCH (e.g., a HARQ acknowledgment may be given a higher priority than a CSI report, and a scheduling request may be higher priority than a CSI report but less important than a HARQ acknowledgment). In some examples, PDCCH may have a higher priority within a duration when a retransmission timer is running after a UE 115 sends a HARQ-ACK report for a failure in PDSCH reception, which may have a higher priority than CSI-RS. The UE 115 may thus compare a priority of the channel or signal with a priority of measurement gap to determine the handling of a measurement gap.

In some cases, the network may define priority levels based on the communication resource type and/or the measurement type associated with the measurement gap 420. For example, DCI 410 scheduling a communication resource may include a priority index field (e.g., for dynamic grants). For SPS and configured grants, radio resource control configuration of the SPS or configured grant may include a priority index field. Control signaling configuring measurement gap(s) 420 may include a priority index field for the measurement gap(s) 420. For example, the UE 115 may follow a low priority and high priority indication based on the priority index field in DCI for dynamically scheduled communication resources, and may follow SPS and CG priority in RRC configuration of SPS and CG. In some examples, the network entity 105 may configure a priority for the measurement gap. Separate priority levels may be configured for inter-frequency or inter-radio access technology measurement, beam measurement, intra-frequency measurement when an active BWP of a UE 115 does not contain SSB, or any combination thereof.

Figure 5:
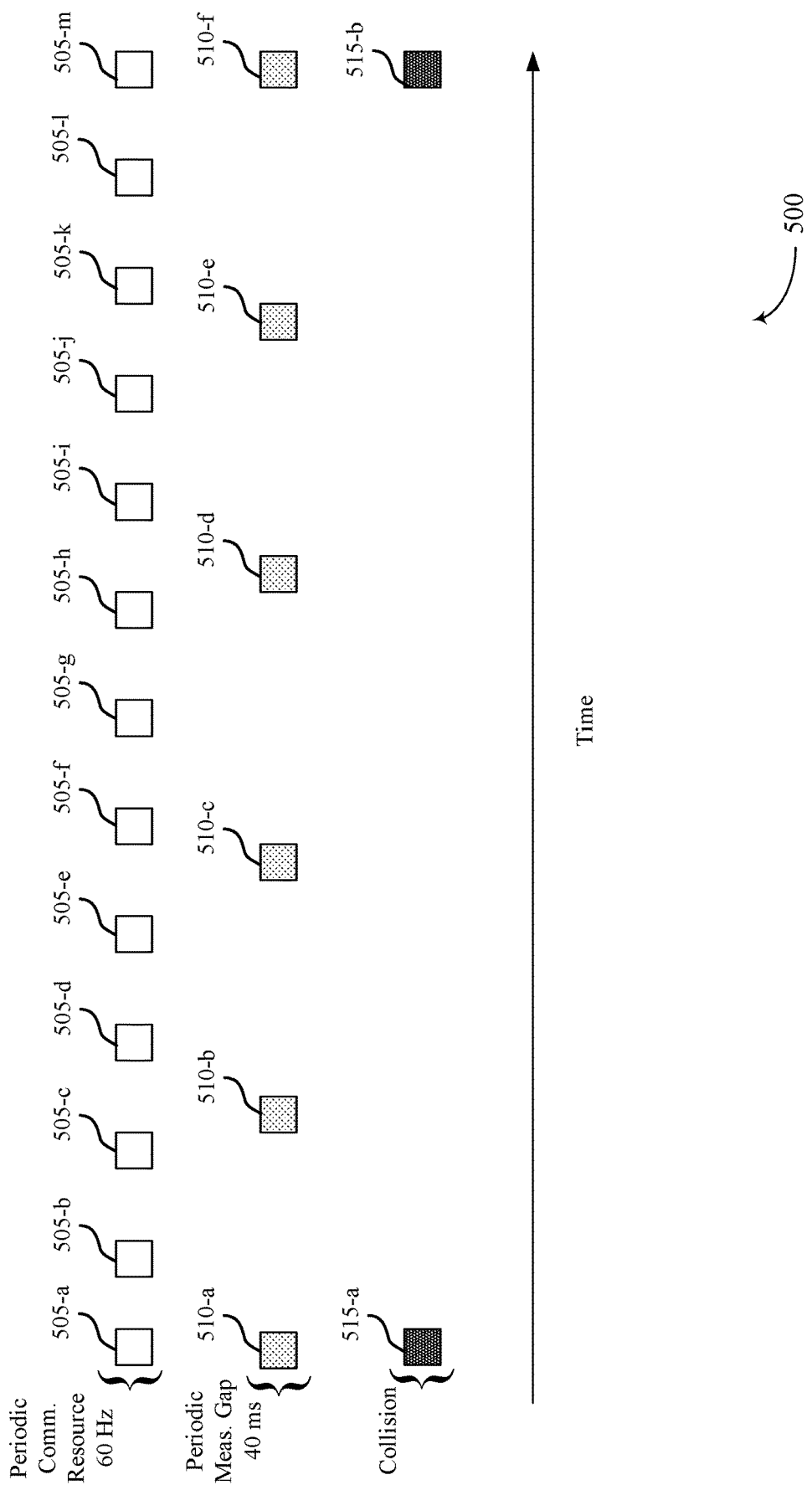
FIG. 5 illustrates an example of a timing diagram that supports handling of measurement gap collisions in accordance with one or more aspects of the present disclosure.

FIG. 5 illustrates an example of a timing diagram 500 that supports handling of measurement gap collisions in accordance with one or more aspects of the present disclosure. In some examples, the timing diagram 500 may implement aspects of wireless communications systems 100 or 200.

In some cases, a UE 115 may receive control signaling configuring a periodic pattern of measurement gaps 510 and a periodic set of communication resources 505. Collisions 515 between periodic measurement gaps 510 and periodic communication resources 505 (e.g., SPS, configured grants, periodic CSI-RS, periodic SRS, or dynamic grant based PUSCH or PDSCH scheduled for periodic data arrival) may occur when the period of the communication resources 505 does not line up with the period of the measurement gaps 510. A collision pattern may be periodic, with the periodicity of the collision pattern being the least common multiple of the measurement gap periodicity and the communication resource periodicity.

For example, the collision pattern between a 60 Hz communication resource 505 process and measurement gap 510 pattern with 40 ms periodicity may have a period of 200 ms. In some cases, an outer period (e.g., that may be an integer multiple of the measurement gap period) and a skipping mask may be defined to avoid collisions between any periodic communication resource 505 process and the measurement gaps 510. The skipping mask may be the collision pattern being the least common multiple of the measurement gap periodicity and the communication resource periodicity or a subset of the collision pattern. Multiple skipping masks with different periodicities and/or offsets between measurement gaps 510 and periodic communication resource 505 processes may be defined, for example when there are multiple periodic communication resource 505 processes. A skipping mask may be a subset of the measurement gap occasions. In some cases, the network may indicate to the UE 115 whether to skip a measurement gap 510 for a mask or to perform the measurement in the measurement gap 510 and skip the communication resource 505.

In some cases, for periodic communication resources 505 (e.g., for higher layer configured resources such as PUCCH, configured grant PUSCH, PDCCH, SPS PDSCH, periodic or SPS SRS, or periodic or SPS CSI-RS configured via RRC signaling), the UE 115 may resolve collisions 515 based on priority levels associated with the communication resources 505 and the measurement gaps 510. For example, a priority may be defined for measurement gaps 510 and for different periodic communication resources 505. (e.g., PUCCH, configured grant PUSCH, PDCCH, SPS PDSCH, periodic or SPS SRS, or periodic or SPS CSI-RS may each have an assigned priority level). When a collision occurs, the UE 115 may decide to skip the measurement gap 510 or to skip the communication resource 505 based on a comparison of the respective priority levels. In some cases, PUCCH may be higher priority than PUSCH, and PDCCH may be higher priority than PDSCH. In some cases, different levels of priority may be defined based on what is carried in a PUCCH (e.g., a HARQ acknowledgment may be given a higher priority than a CSI report, and a scheduling request may be higher priority than a CSI report but less important than a HARQ acknowledgment). In some cases, the network may define priority levels based on the communication resource 505 type and/or the measurement type associated with the measurement gap 510. For example, for SPS and configured grants, radio resource control configuration of the SPS or configured grant may include a priority index field. Control signaling configuring measurement gap(s) 510 may include a priority index field for the measurement gap(s) 510.

Figure 6:
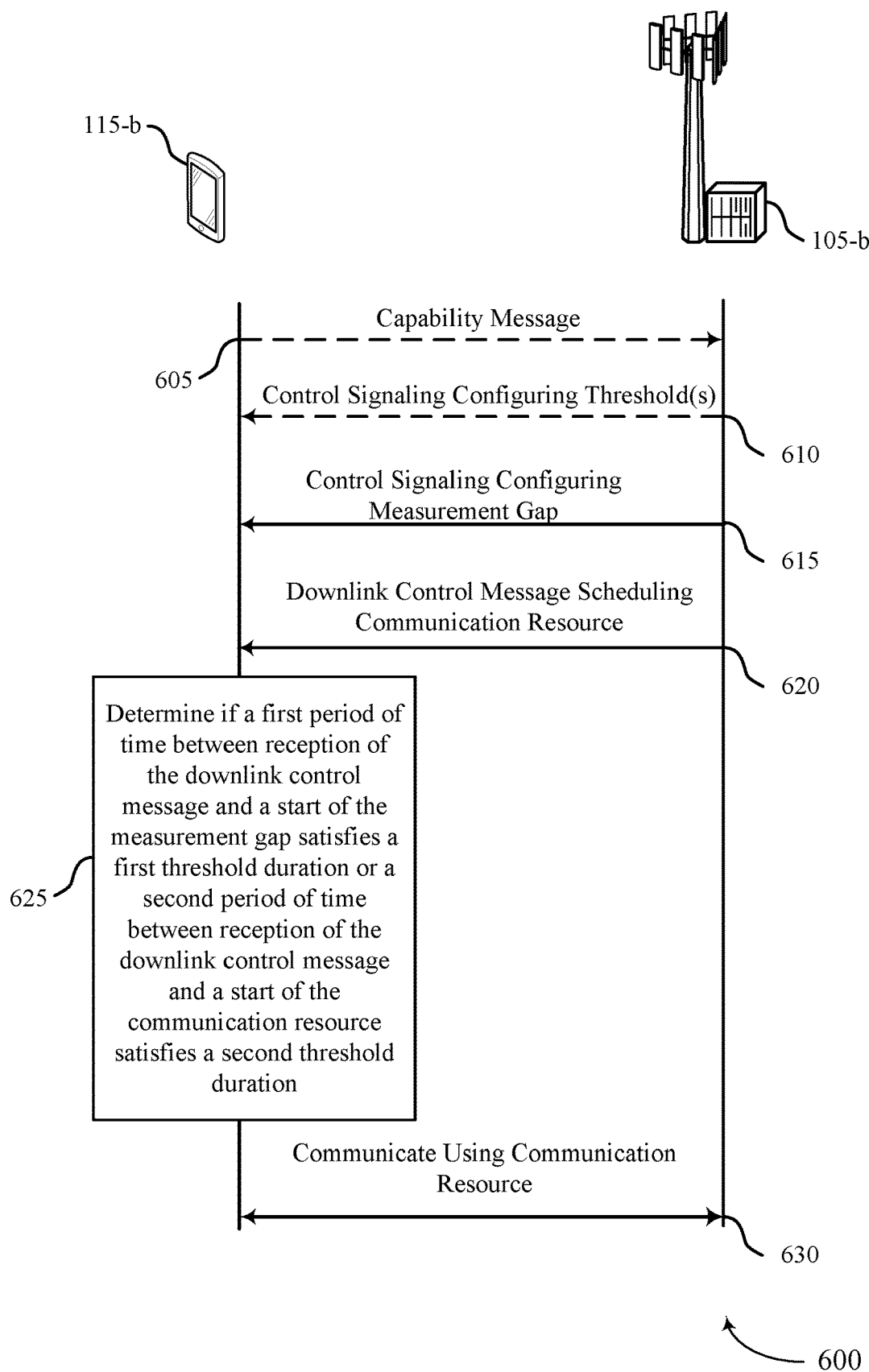
FIG. 6 illustrates an example of a process flow that supports handling of measurement gap collisions in accordance with one or more aspects of the present disclosure.

FIG. 6 illustrates an example of a process flow 600 that supports handling of measurement gap collisions in accordance with one or more aspects of the present disclosure. In some examples, the process flow 600 may implement aspects of wireless communications systems 100 or 200. The process flow 600 may include a UE 115-*b*, which may be an example of a UE 115 as described herein. The process flow 600 may include a network entity 105-*b*, which may be an example of a network entity 105 as described herein. In the following description of the process flow 600, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 600, and other operations may be added to the process flow 600.

In some examples, at 605, the UE 115-*b* may transmit, to the network entity, one of a capability message or a UE assistance information message indicating at least one of a first target time between associated downlink control messages and measurement gaps for the UE or a second target time between associated downlink control messages and communication resources for the UE.

In some examples, at 610, in response to the capability message or the UE assistance information message, the UE 115-*b* may receive, from the network entity 105-*b*, control signaling indicating a first threshold duration or a second threshold duration.

At 615, the UE 115-*b* may receive, from a network entity 105-*b*, control signaling configuring a measurement gap.

At 620, the UE 115-*b* may receive, from the network entity 105-*b*, a downlink control message scheduling a communication resource, where the communication resource at least partially overlaps in time with (e.g., collides with) the measurement gap.

At 625, the UE 115-*b* may determine if a first period of time between reception of the downlink control message and a start of the measurement gap satisfies the first threshold duration or a second period of time between reception of the downlink control message and a start of the communication resource satisfies the second threshold duration. In some examples, the first and/or second threshold durations may be based on the control signaling received at 610. In some examples, the first and/or second threshold durations may be based on a capability of the UE 115-*b*. In some examples, the UE 115-*b* may store the first and/or second threshold durations in memory of the UE 115-*b*. In some examples, the first and/or second threshold durations may not be configured by the network (e.g., steps 605 and/or 610 may be omitted).

At 630, the UE 115-*b* may communicate using the communication resource if at 625 the UE 115-*b* determines that the first period of time between reception of the downlink control message and the start of the measurement gap satisfies the first threshold duration or the second period of time between reception of the downlink control message and the start of the communication resource satisfies the second threshold duration.

In some cases, communicating using the communication resource is based on the first period of time satisfying the first threshold duration. In some cases, the UE 115-b may skip an entirety of the measurement gap based on the first period of time satisfying the first threshold duration and the communication resource at least partially overlapping in time with the measurement gap.

In some cases, communicating using the communication resource is based on the second period of time satisfying the second threshold duration. In some cases, the UE 115-b may enter the measurement gap, and cancel the measurement gap before completion based on the second period of time satisfying the second threshold duration and the communication resource at least partially overlapping in time with the measurement gap.

In some cases, the UE 115-b may receive an indication of a first priority level associated with the measurement gap and an indication of a second priority level associated with the communication resource. The UE 115-b may communicate using the communication resource based on the first priority level and the second priority level (e.g., if the first priority level is below the second priority level). In some cases, the UE 115-b may receive the indication of the first priority level via the control signaling at 615. In some cases, the UE 115-b may receive the indication of the second priority level via the downlink control message at 620. In some cases, the UE 115-b may receive with the control signaling at 615, an indication of a measurement associated with the measurement gap, and the first priority level may be based on the measurement. In some cases, the second priority level may be based on a communication resource type of the communication resource.

In some cases, the UE 115-b may receive the downlink control message via a first component carrier and the communication resource may be associated with a second component carrier, and the downlink control message may not overlap or may at least partially overlap in time with the measurement gap.

In some cases, the UE 115-b may receive the downlink control message via a component carrier and the communication resource may be associated with the same component carrier, and the UE 115-b may communicate using the communication resource based on receiving the downlink control message before the measurement gap.

In some cases, the communication resource is a downlink communication resource, and at least one of the first threshold duration or the second threshold duration may be based on at least one of a first target time between associated downlink control messages and measurement gaps for the UE 115-b or a second target time between associated downlink control messages and downlink communication resources for the UE 115-b. In some cases, the communication resource is a downlink communication resource, and the second threshold duration is based on a duration for the UE 115-b to tune radio frequency circuitry of the UE 115-b from the measurement gap to a bandwidth part associated with the downlink communication resource.

In some cases, the communication resource is an uplink communication resource, and at least one of the first threshold duration or the second threshold duration is based on at least one of a first target time between associated downlink control messages and measurement gaps for the UE 115-b or a second target duration between associated downlink control messages and uplink communication resources for the UE 115-b. In some cases, the communication resource is an uplink communication resource, and the first threshold duration or the second threshold duration is based on a downlink control message processing time capability of the UE 115-b and an uplink shared channel message preparation time capability of the UE 115-b. In some cases, the second threshold duration may be based on a duration for the UE 115-b to tune radio frequency circuitry of the UE 115-b from the measurement gap to a bandwidth part associated with the uplink communication resource.

Figure 7:
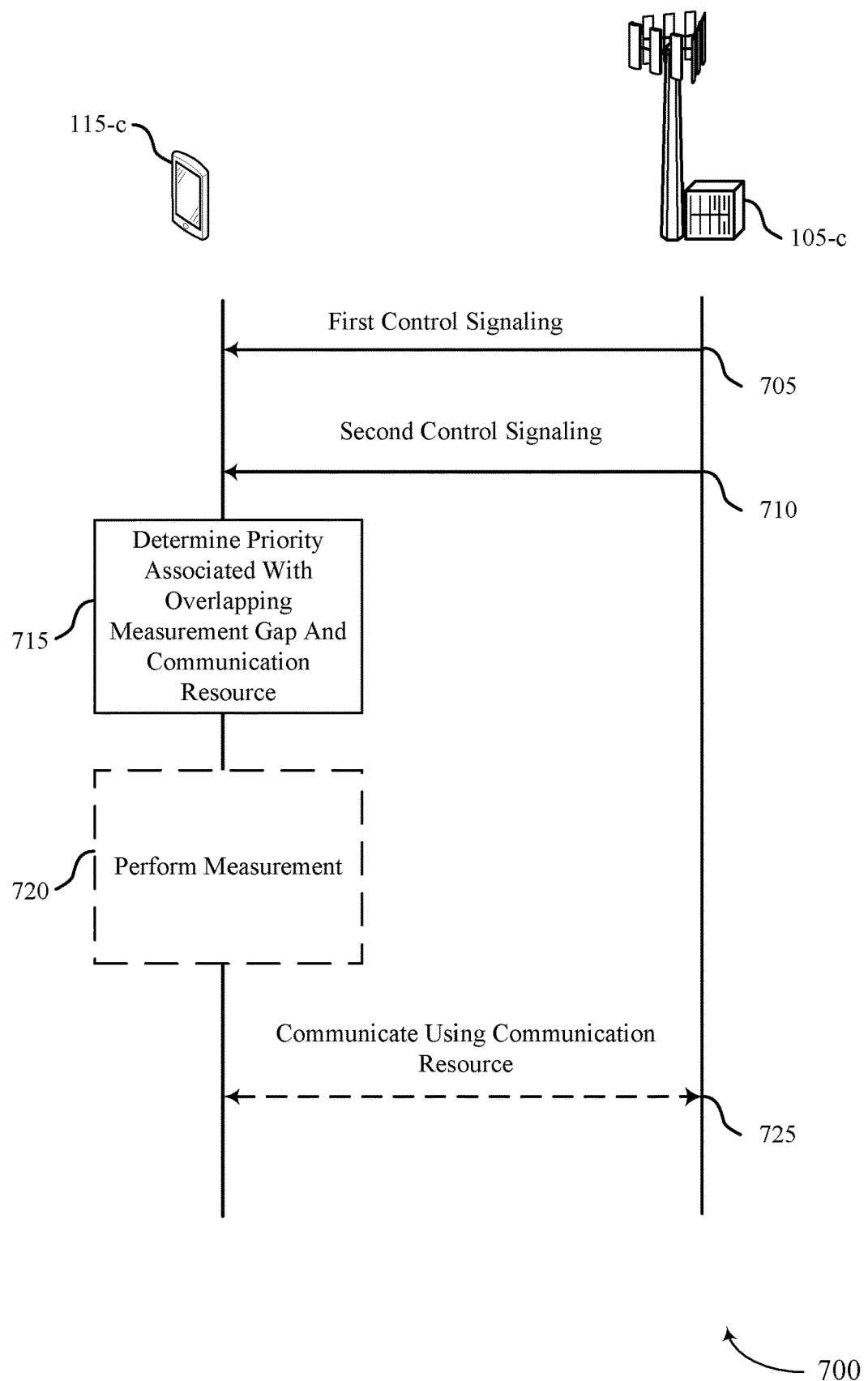
FIG. 7 illustrates an example of a process flow that supports handling of measurement gap collisions in accordance with one or more aspects of the present disclosure.

FIG. 7 illustrates an example of a process flow 700 that supports handling of measurement gap collisions in accordance with one or more aspects of the present disclosure. In some examples, the process flow 700 may implement aspects of wireless communications systems 100 or 200. The process flow 700 may include a UE 115-c, which may be an example of a UE 115 as described herein. The process flow 700 may include a network entity 105-c, which may be an example of a network entity 105 as described herein. In the following description of the process flow 700, the operations between the network entity 105-c and the UE 115-c may be transmitted in a different order than the example order shown, or the operations performed by the network entity 105-c and the UE 115-c may be performed in different orders or at different times. Some operations may also be omitted from the process flow 700, and other operations may be added to the process flow 700.

At 705, the UE 115-c may receive, from the network entity 105-c, first control signaling configuring a set of measurement gaps.

At 710, the UE 115-c may receive, from the network entity 105-c, second control signaling scheduling a set of periodic communication resources, where a measurement gap of the set of measurement gaps at least partially overlaps in time with (e.g., collides with) a communication resource of the set of periodic communication resources.

At 715, the UE 115-c may determine a priority between the overlapping measurement gap and communication resource based on a priority scheme.

At 720, the UE 115-c may perform a measurement during the measurement gap if the priority scheme assigns a higher priority level to the measurement gap than to the communication resource. At 725, the UE may communicate using the communication resource if the priority scheme assigns a higher priority level to the communication resource than to the measurement gap.

In some cases, the UE 115-c may receive, from the network entity 105-c, an indication of the priority scheme.

In some cases, a priority level associated with the measurement gap is based on a position of the measurement gap within the set of measurement gaps, and the priority scheme is based on the priority level.

In some cases, the UE 115-c may receive, with the control signaling at 710, an indication of a priority level associated with the set of periodic communication resources, and the priority scheme is based on the priority level.

In some cases, a priority level associated with the set of periodic communication resources is based on a communication resource type of the set of periodic communication resources, and the priority scheme is based on the priority level.

In some cases, the UE 115-c may receive, from the network entity 105-c, a downlink control message scheduling the communication resource; the downlink control message may indicate a priority level associated with the communication resource; and the priority scheme is based on the priority level.

In some cases, the UE 115-c may receive, from the network entity 105-c, an indication of the measurement associated with the measurement gap of the set of measurement gaps; a priority level associated with the measurement gap is based on the measurement; and the priority scheme is based on the priority level.

Figure 8:
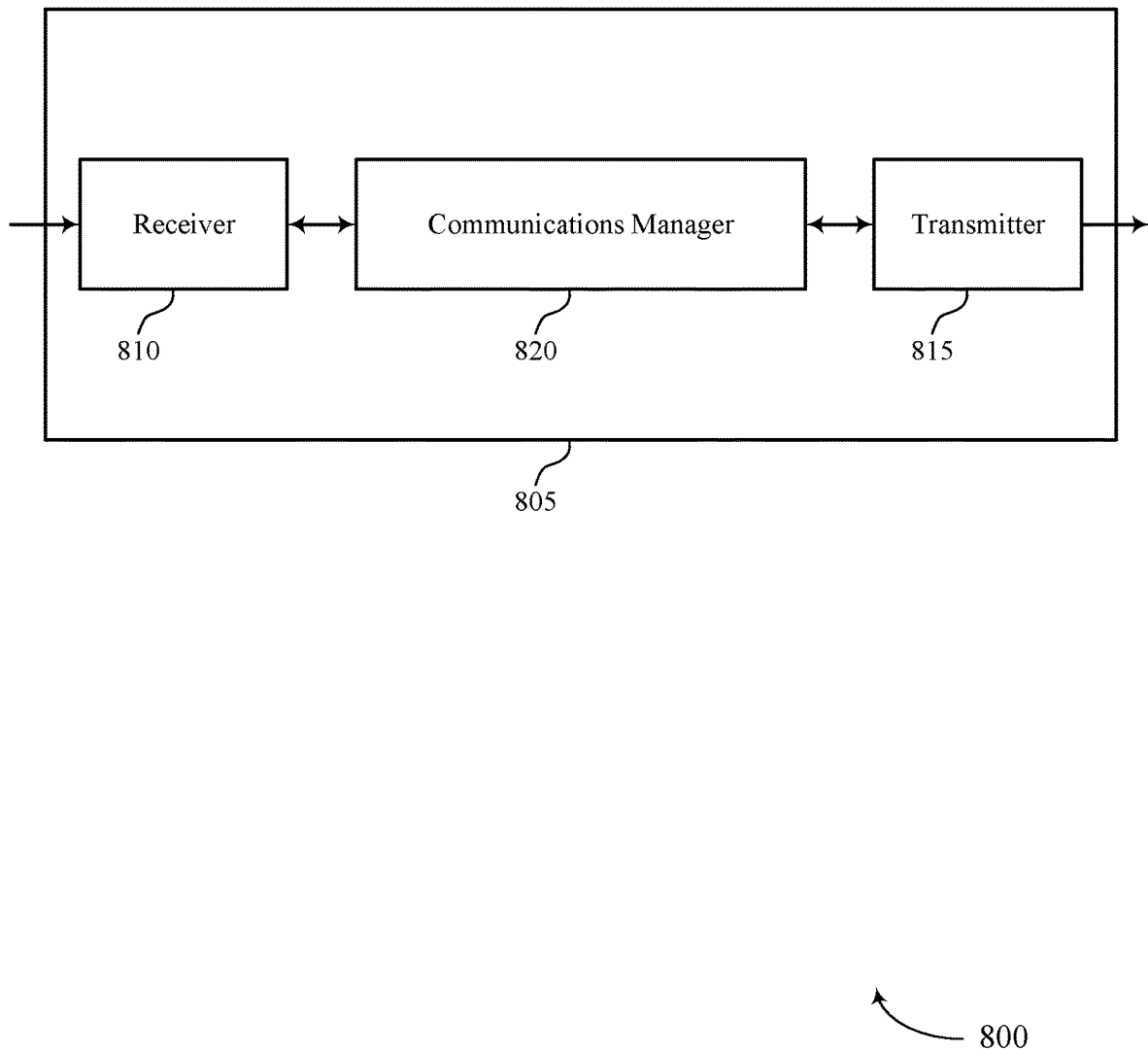
FIGS. 8 and 9 show block diagrams of devices that support handling of measurement gap collisions in accordance with one or more aspects of the present disclosure.

FIG. 8 shows a block diagram 800 of a device 805 that supports handling of measurement gap collisions in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to handling of measurement gap collisions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to handling of measurement gap collisions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of handling of measurement gap collisions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving, from a network entity, control signaling configuring a measurement gap. The communications manager 820 may be configured as or otherwise support a means for receiving, from the network entity, a downlink control message scheduling a communication resource, where the communication resource at least partially overlaps in time with the measurement gap. The communications manager 820 may be configured as or otherwise support a means for communicating using the communication resource based on at least one of a first period of time between reception of the downlink control message and a start of the measurement gap satisfying a first threshold duration or a second period of time between reception of the downlink control message and a start of the communication resource satisfying a second threshold duration.

Additionally, or alternatively, the communications manager 820 may support wireless communications in accordance with examples as disclosed herein. For example, the communications manager 820 may be configured as or otherwise support a means for receiving, from a network entity, first control signaling configuring a set of measurement gaps. The communications manager 820 may be configured as or otherwise support a means for receiving, from the network entity, second control signaling scheduling a set of periodic communication resources, where a measurement gap of the set of measurement gaps at least partially overlaps in time with a communication resource of the set of periodic communication resources. The communications manager 820 may be configured as or otherwise support a means for performing a measurement during the measurement gap or communicating using the communication resource based on a priority scheme associated with the set of measurement gaps and the set of periodic communication resources.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for flexible management of collisions between measurement gaps and communication resources which may enable reduced processing, reduced power consumption, and more efficient utilization of communication resources.

Figure 9:
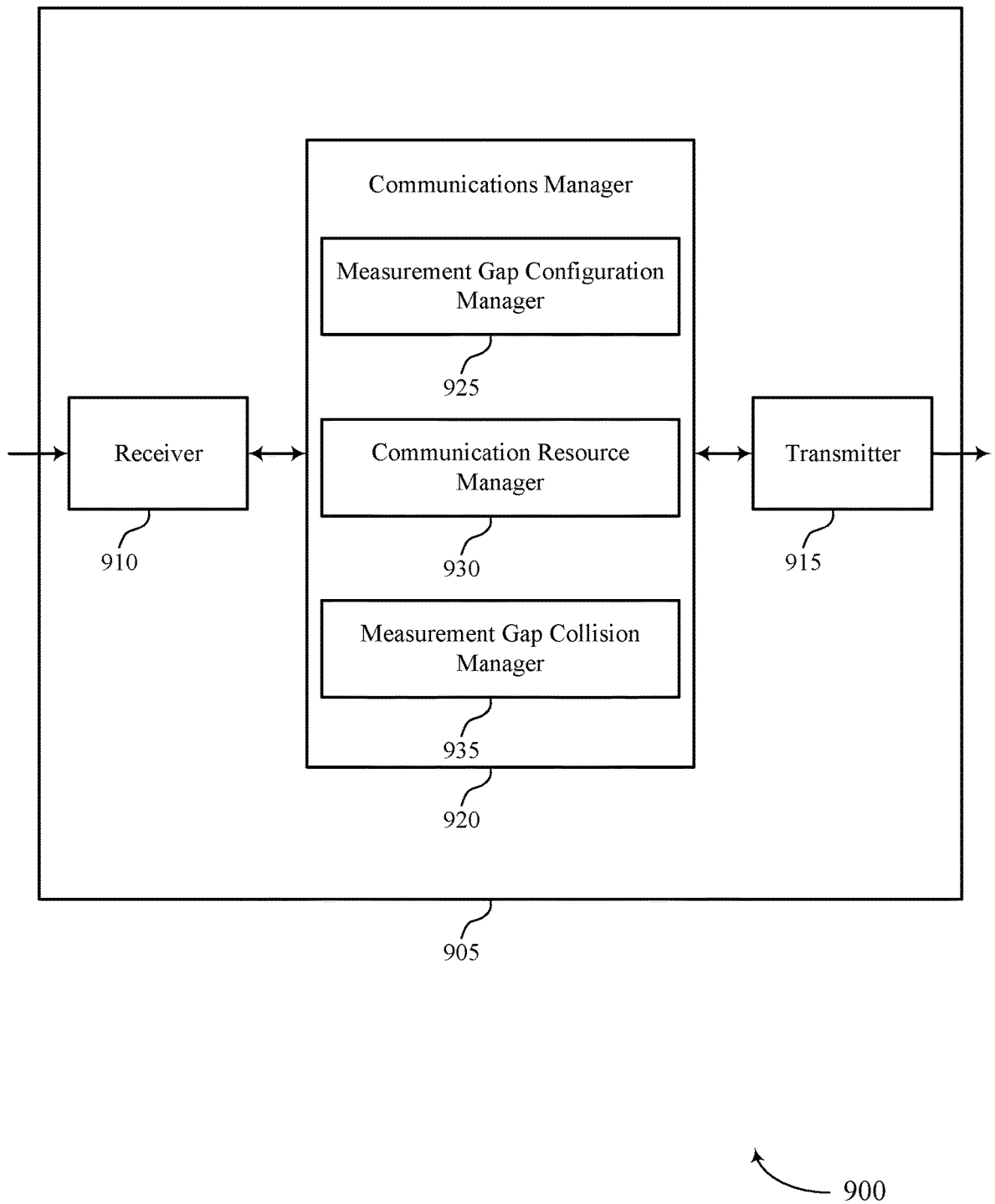

FIG. 9 shows a block diagram 900 of a device 905 that supports handling of measurement gap collisions in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to handling of measurement gap collisions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to handling of measurement gap collisions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of handling of measurement gap collisions as described herein. For example, the communications manager 920 may include a measurement gap configuration manager 925, a communication resource manager 930, a measurement gap collision manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The measurement gap configuration manager 925 may be configured as or otherwise support a means for receiving, from a network entity, control signaling configuring a measurement gap. The communication resource manager 930 may be configured as or otherwise support a means for receiving, from the network entity, a downlink control message scheduling a communication resource, where the communication resource at least partially overlaps in time with the measurement gap. The measurement gap collision manager 935 may be configured as or otherwise support a means for communicating using the communication resource based on at least one of a first period of time between reception of the downlink control message and a start of the measurement gap satisfying a first threshold duration or a second period of time between reception of the downlink control message and a start of the communication resource satisfying a second threshold duration.

Additionally, or alternatively, the communications manager 920 may support wireless communications in accordance with examples as disclosed herein. The measurement gap configuration manager 925 may be configured as or otherwise support a means for receiving, from a network entity, first control signaling configuring a set of measurement gaps. The communication resource manager 930 may be configured as or otherwise support a means for receiving, from the network entity, second control signaling scheduling a set of periodic communication resources, where a measurement gap of the set of measurement gaps at least partially overlaps in time with a communication resource of the set of periodic communication resources. The measurement gap collision manager 935 may be configured as or otherwise support a means for performing a measurement during the measurement gap or communicating using the communication resource based on a priority scheme associated with the set of measurement gaps and the set of periodic communication resources.

Figure 10:
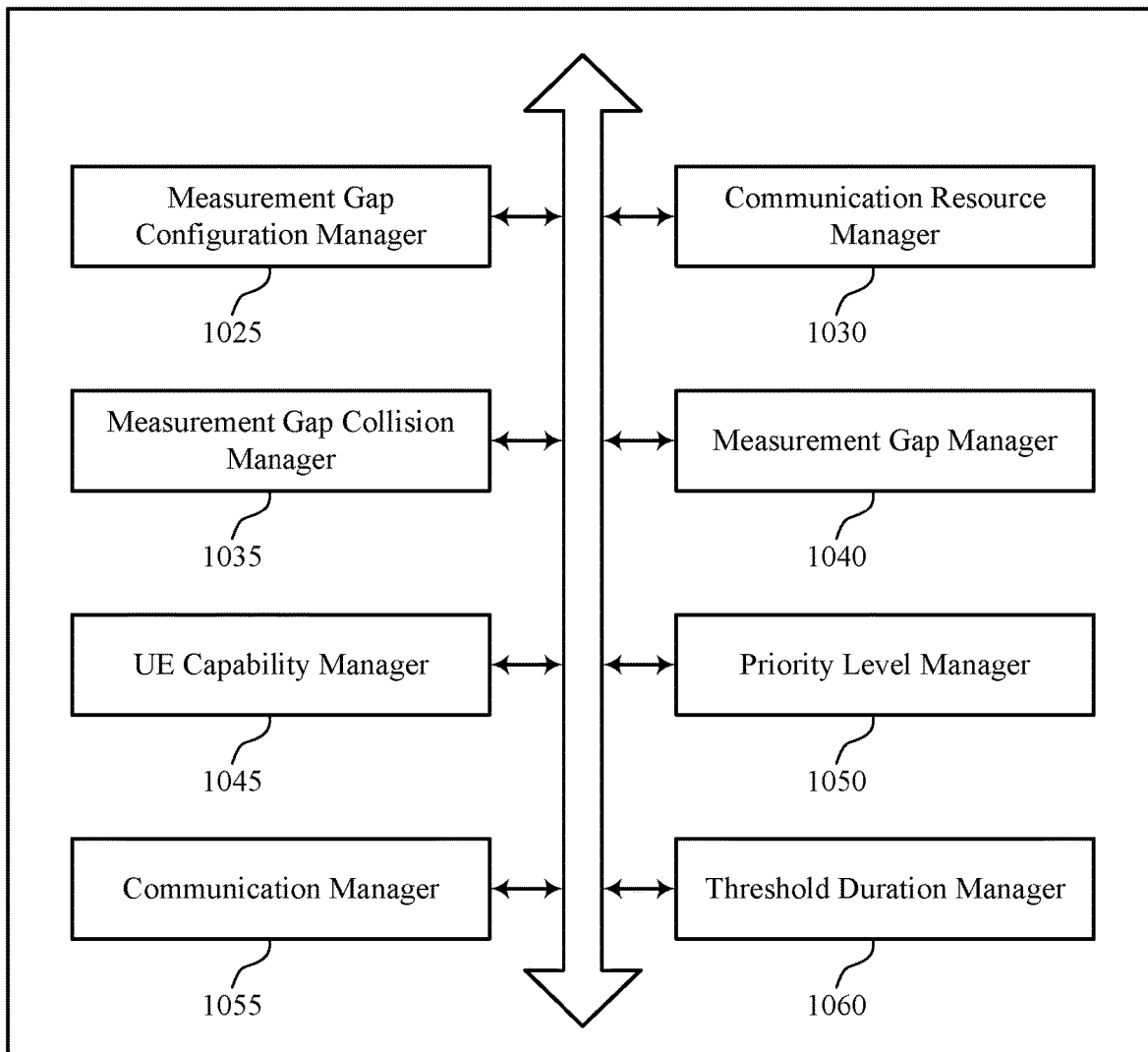
FIG. 10 shows a block diagram of a communications manager that supports handling of measurement gap collisions in accordance with one or more aspects of the present disclosure.

FIG. 10 shows a block diagram 1000 of a communications manager 1020 that supports handling of measurement gap collisions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of handling of measurement gap collisions as described herein. For example, the communications manager 1020 may include a measurement gap configuration manager 1025, a communication resource manager 1030, a measurement gap collision manager 1035, a measurement gap manager 1040, a UE capability manager 1045, a priority level manager 1050, a communication manager 1055, a threshold duration manager 1060, or any combination thereof. Each of these components may communicate, directly or indirectly, with one another (e.g., via one or more buses).

The communications manager 1020 may support wireless communications at a UE in accordance with examples as disclosed herein. The measurement gap configuration manager 1025 may be configured as or otherwise support a means for receiving, from a network entity, control signaling configuring a measurement gap. The communication resource manager 1030 may be configured as or otherwise support a means for receiving, from the network entity, a downlink control message scheduling a communication resource, where the communication resource at least partially overlaps in time with the measurement gap. The measurement gap collision manager 1035 may be configured as or otherwise support a means for communicating using the communication resource based on at least one of a first period of time between reception of the downlink control message and a start of the measurement gap satisfying a first threshold duration or a second period of time between reception of the downlink control message and a start of the communication resource satisfying a second threshold duration.

In some examples, communicating using the communication resource is based on the first period of time satisfying the first threshold duration.

In some examples, the measurement gap collision manager 1035 may be configured as or otherwise support a means for skipping an entirety of the measurement gap based on the first period of time satisfying the first threshold duration and the communication resource at least partially overlapping in time with the measurement gap.

In some examples, communicating using the communication resource is based on the second period of time satisfying the second threshold duration.

In some examples, the measurement gap manager 1040 may be configured as or otherwise support a means for entering the measurement gap. In some examples, the measurement gap collision manager 1035 may be configured as or otherwise support a means for canceling the measurement gap before completion based on the second period of time satisfying the second threshold duration and the communication resource at least partially overlapping in time with the measurement gap.

In some examples, the UE capability manager 1045 may be configured as or otherwise support a means for transmitting, to the network entity, one of a capability message or a UE assistance information message indicating at least one of a first target time between associated downlink control messages and measurement gaps for the UE or a second target time between associated downlink control messages and downlink communication resources for the UE.

In some examples, the threshold duration manager 1060 may be configured as or otherwise support a means for receiving, from the network entity, second control signaling indicating at least one of the first threshold duration or the second threshold duration, where the second control signaling is based on the capability message or the UE assistance information message.

In some examples, the priority level manager 1050 may be configured as or otherwise support a means for receiving an indication of a first priority level associated with the measurement gap. In some examples, the priority level manager 1050 may be configured as or otherwise support a means for receiving an indication of a second priority level associated with the communication resource, and where communicating using the communication resource is based on the first priority level and the second priority level.

In some examples, the priority level manager 1050 may be configured as or otherwise support a means for receiving the indication of the first priority level via the control signaling.

In some examples, the priority level manager 1050 may be configured as or otherwise support a means for receiving the indication of the second priority level via the downlink control message.

In some examples, the priority level manager 1050 may be configured as or otherwise support a means for receiving, with the control signaling, an indication of a measurement associated with the measurement gap, where the first priority level is based on the measurement.

In some examples, the second priority level is based on a communication resource type of the communication resource.

In some examples, the downlink control message is received via a first component carrier and the communication resource is associated with a second component carrier. In some examples, the downlink control message does not overlap or at least partially overlaps in time with the measurement gap.

In some examples, the downlink control message is received via a component carrier and the communication resource is associated with the component carrier. In some examples, communicating using the communication resource based on receiving the downlink control message before the measurement gap.

In some examples, the communication resource is a downlink communication resource. In some examples, at least one of the first threshold duration or the second threshold duration is based on at least one of a first target time between associated downlink control messages and measurement gaps for the UE or a second target time between associated downlink control messages and downlink communication resources for the UE.

In some examples, the communication resource is a downlink communication resource. In some examples, the second threshold duration is based on a duration for the UE to tune radio frequency circuitry of the UE from the measurement gap to a bandwidth part associated with the downlink communication resource.

In some examples, the communication resource is an uplink communication resource. In some examples, at least one of the first threshold duration or the second threshold duration is based on at least one of a first target time between associated downlink control messages and measurement gaps for the UE or a second target duration between associated downlink control messages and uplink communication resources for the UE.

In some examples, the communication resource is an uplink communication resource. In some examples, the first threshold duration or the second threshold duration is based on a downlink control message processing time capability of the UE and an uplink shared channel message preparation time capability of the UE.

In some examples, the second threshold duration is based on a duration for the UE to tune radio frequency circuitry of the UE from the measurement gap to a bandwidth part associated with the uplink communication resource.

Additionally, or alternatively, the communications manager 1020 may support wireless communications in accordance with examples as disclosed herein. In some examples, the measurement gap configuration manager 1025 may be configured as or otherwise support a means for receiving, from a network entity, first control signaling configuring a set of measurement gaps. In some examples, the communication resource manager 1030 may be configured as or otherwise support a means for receiving, from the network entity, second control signaling scheduling a set of periodic communication resources, where a measurement gap of the set of measurement gaps at least partially overlaps in time with a communication resource of the set of periodic communication resources. In some examples, the measurement gap collision manager 1035 may be configured as or otherwise support a means for performing a measurement during the measurement gap or communicating using the communication resource based on a priority scheme associated with the set of measurement gaps and the set of periodic communication resources.

In some examples, the priority level manager 1050 may be configured as or otherwise support a means for receiving, from the network entity, an indication of the priority scheme.

In some examples, the measurement gap manager 1040 may be configured as or otherwise support a means for performing the measurement during the measurement gap based on the priority scheme assigning a higher priority level to the measurement gap than to the communication resource.

In some examples, the communication manager 1055 may be configured as or otherwise support a means for communicating using the communication resource based on the priority scheme assigning a higher priority level to the communication resource that to the measurement gap.

In some examples, a priority level associated with the measurement gap is based on a position of the measurement gap within the set of measurement gaps. In some examples, the priority scheme is based on the priority level.

In some examples, the priority level manager 1050 may be configured as or otherwise support a means for receiving, with the second control signaling, an indication of a priority level associated with the set of periodic communication resources, where the priority scheme is based on the priority level.

In some examples, a priority level associated with the set of periodic communication resources is based on a communication resource type of the set of periodic communication resources. In some examples, the priority scheme is based on the priority level.

In some examples, the priority level manager 1050 may be configured as or otherwise support a means for receiving, from the network entity, a downlink control message scheduling the communication resource, where the downlink control message indicates a priority level associated with the communication resource, and where the priority scheme is based on the priority level.

In some examples, the measurement gap configuration manager 1025 may be configured as or otherwise support a means for receiving, with the first control signaling, an indication of the measurement associated with the measurement gap of the set of measurement gaps, where a priority level associated with the measurement gap is based on the measurement, and where the priority scheme is based on the priority level.

Figure 11:
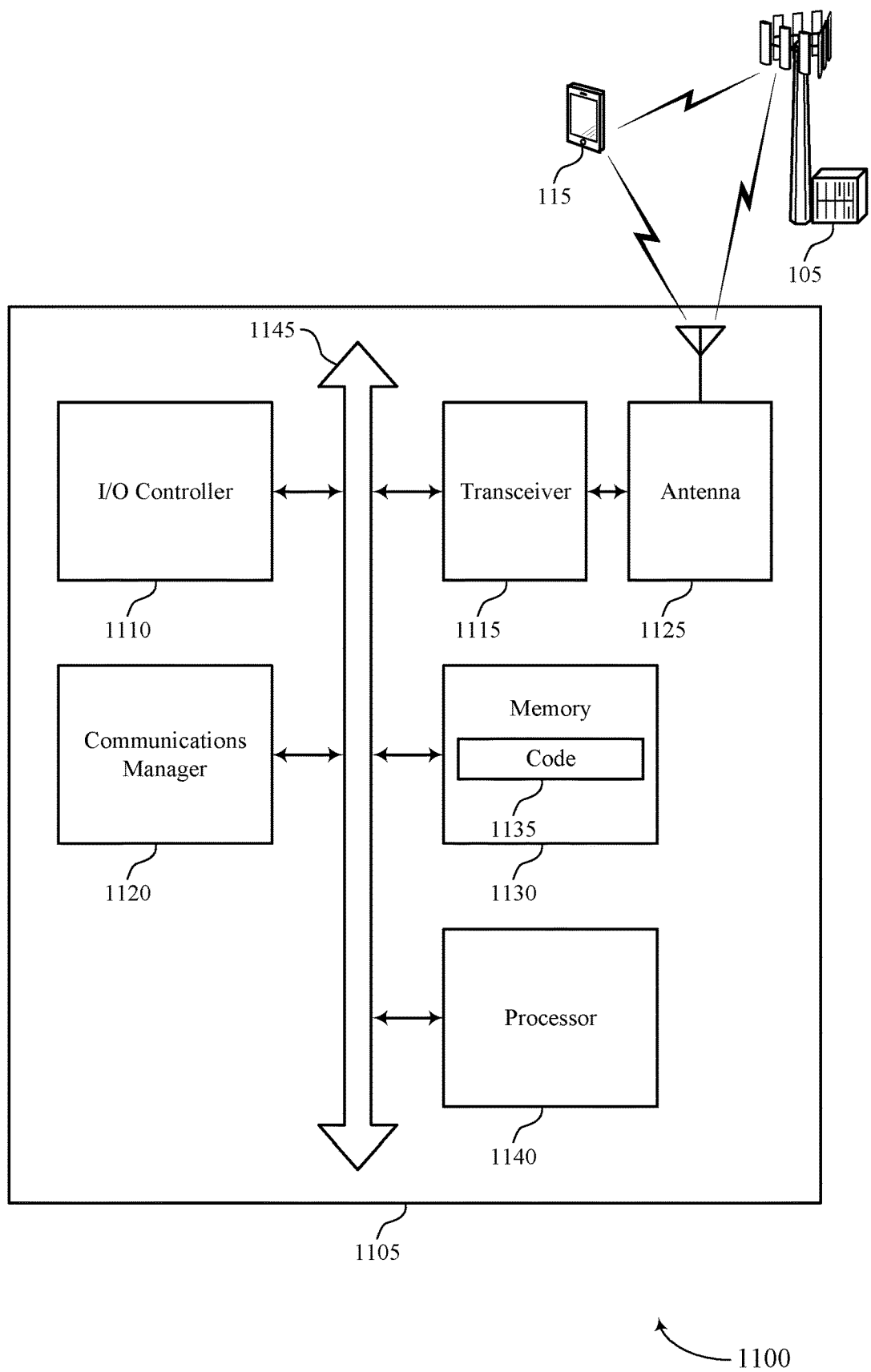
FIG. 11 shows a diagram of a system including a device that supports handling of measurement gap collisions in accordance with one or more aspects of the present disclosure.

FIG. 11 shows a diagram of a system 1100 including a device 1105 that supports handling of measurement gap collisions in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting handling of measurement gap collisions). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a network entity, control signaling configuring a measurement gap. The communications manager 1120 may be configured as or otherwise support a means for receiving, from the network entity, a downlink control message scheduling a communication resource, where the communication resource at least partially overlaps in time with the measurement gap. The communications manager 1120 may be configured as or otherwise support a means for communicating using the communication resource based on at least one of a first period of time between reception of the downlink control message and a start of the measurement gap satisfying a first threshold duration or a second period of time between reception of the downlink control message and a start of the communication resource satisfying a second threshold duration.

Additionally, or alternatively, the communications manager 1120 may support wireless communications in accordance with examples as disclosed herein. For example, the communications manager 1120 may be configured as or otherwise support a means for receiving, from a network entity, first control signaling configuring a set of measurement gaps. The communications manager 1120 may be configured as or otherwise support a means for receiving, from the network entity, second control signaling scheduling a set of periodic communication resources, where a measurement gap of the set of measurement gaps at least partially overlaps in time with a communication resource of the set of periodic communication resources. The communications manager 1120 may be configured as or otherwise support a means for performing a measurement during the measurement gap or communicating using the communication resource based on a priority scheme associated with the set of measurement gaps and the set of periodic communication resources.

By including or configuring the communications manager 1120 in accordance with examples as described herein, the device 1105 may support techniques for flexible management of collisions between measurement gaps and communication resources which may enable reduced latency, improved user experience related to reduced processing, reduced power consumption, more efficient utilization of communication resources, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of handling of measurement gap collisions as described herein, or the processor 1140 and the memory 1130 may be otherwise configured to perform or support such operations.

Figure 12:
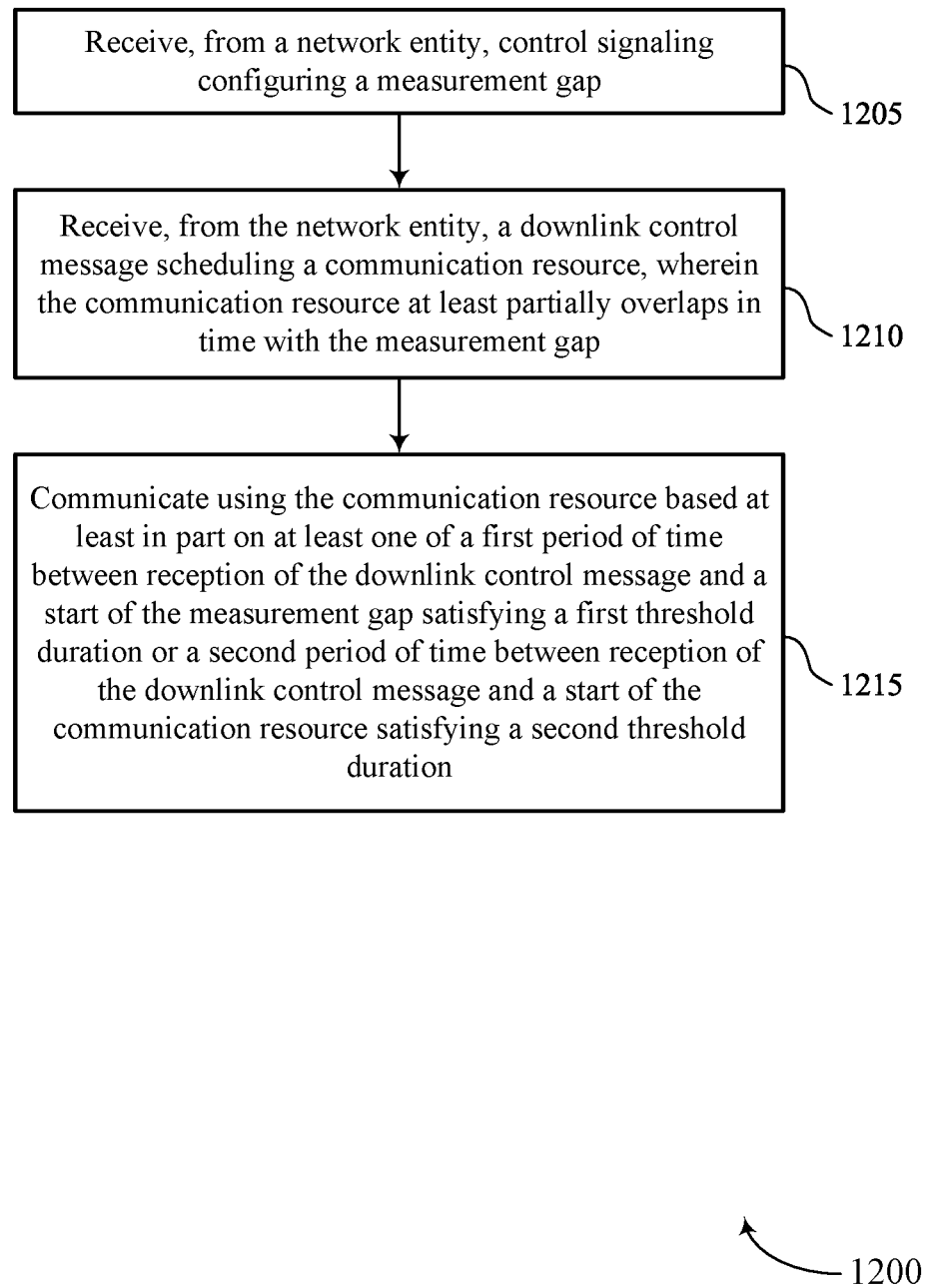
FIGS. 12 through 19 show flowcharts illustrating methods that support handling of measurement gap collisions in accordance with one or more aspects of the present disclosure.

FIG. 12 shows a flowchart illustrating a method 1200 that supports handling of measurement gap collisions in accordance with one or more aspects of the present disclosure. The operations of the method 1200 may be implemented by a UE or components of the UE as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, control signaling configuring a measurement gap. The operations of 1205 may be performed in accordance with examples as disclosed herein. In some examples, aspects of the operations of 1205 may be performed by a measurement gap configuration manager 1025 as described with reference to FIG. 10.

At 1210, the method may include receiving, from the network entity, a downlink control message scheduling a communication resource, where the communication resource at least partially overlaps in time with the measurement gap. The operations of 1210 may be performed in accordance with examples as disclosed herein. In some examples, aspects of the operations of 1210 may be performed by a communication resource manager 1030 as described with reference to FIG. 10.

At 1215, the method may include communicating using the communication resource based on at least one of a first period of time between reception of the downlink control message and a start of the measurement gap satisfying a first threshold duration or a second period of time between reception of the downlink control message and a start of the communication resource satisfying a second threshold duration. The operations of 1215 may be performed in accordance with examples as disclosed herein. In some examples, aspects of the operations of 1215 may be performed by a measurement gap collision manager 1035 as described with reference to FIG. 10.

Figure 13:
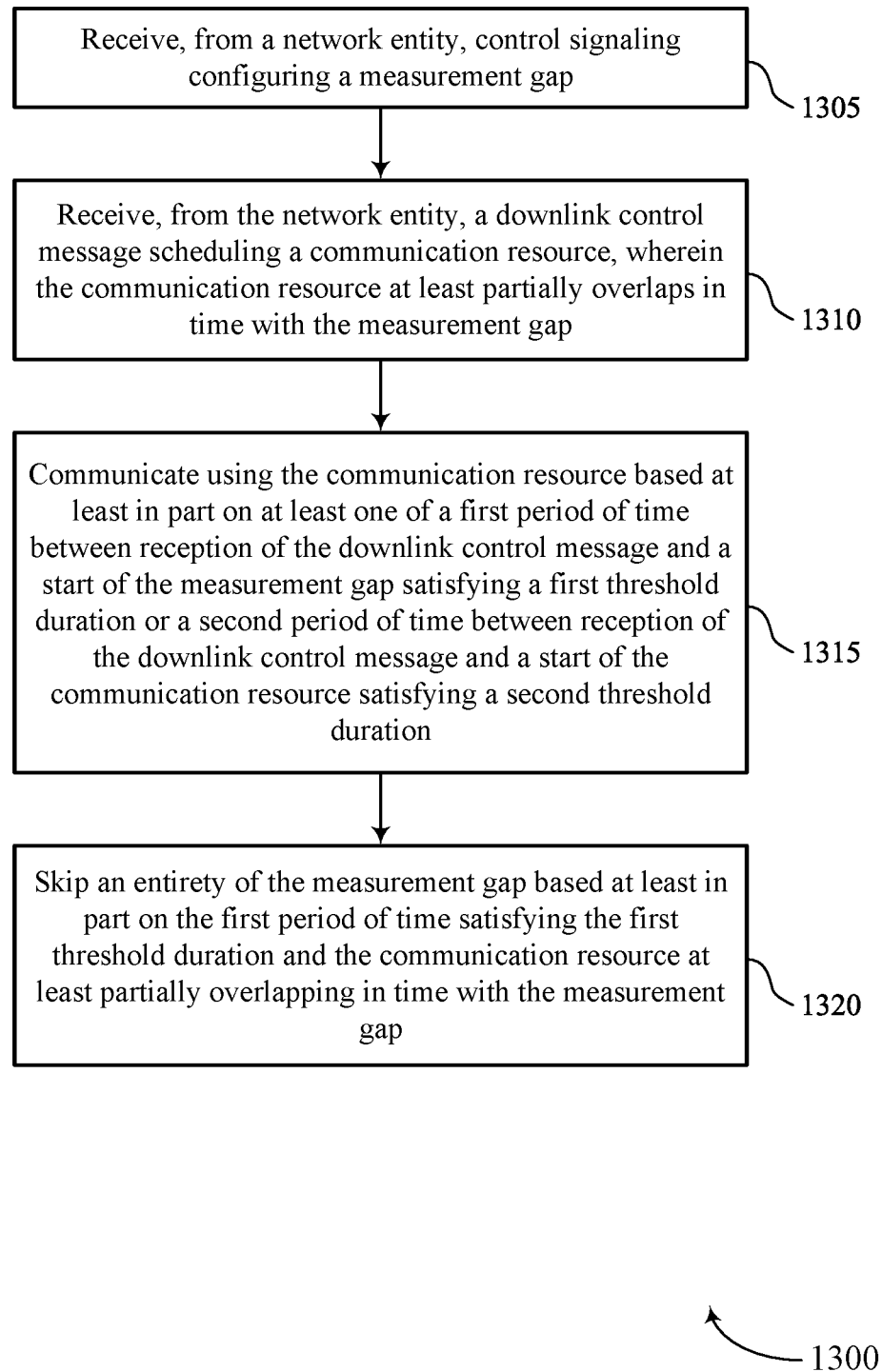

FIG. 13 shows a flowchart illustrating a method 1300 that supports handling of measurement gap collisions in accordance with one or more aspects of the present disclosure. The operations of the method 1300 may be implemented by a UE or components of the UE as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling configuring a measurement gap. The operations of 1305 may be performed in accordance with examples as disclosed herein. In some examples, aspects of the operations of 1305 may be performed by a measurement gap configuration manager 1025 as described with reference to FIG. 10.

At 1310, the method may include receiving, from the network entity, a downlink control message scheduling a communication resource, where the communication resource at least partially overlaps in time with the measurement gap. The operations of 1310 may be performed in accordance with examples as disclosed herein. In some examples, aspects of the operations of 1310 may be performed by a communication resource manager 1030 as described with reference to FIG. 10.

At 1315, the method may include communicating using the communication resource based on at least one of a first period of time between reception of the downlink control message and a start of the measurement gap satisfying a first threshold duration or a second period of time between reception of the downlink control message and a start of the communication resource satisfying a second threshold duration. The operations of 1315 may be performed in accordance with examples as disclosed herein. In some examples, aspects of the operations of 1315 may be performed by a measurement gap collision manager 1035 as described with reference to FIG. 10.

At 1320, the method may include skipping an entirety of the measurement gap based on the first period of time satisfying the first threshold duration and the communication resource at least partially overlapping in time with the measurement gap. The operations of 1320 may be performed in accordance with examples as disclosed herein. In some examples, aspects of the operations of 1320 may be performed by a measurement gap collision manager 1035 as described with reference to FIG. 10.

Figure 14:
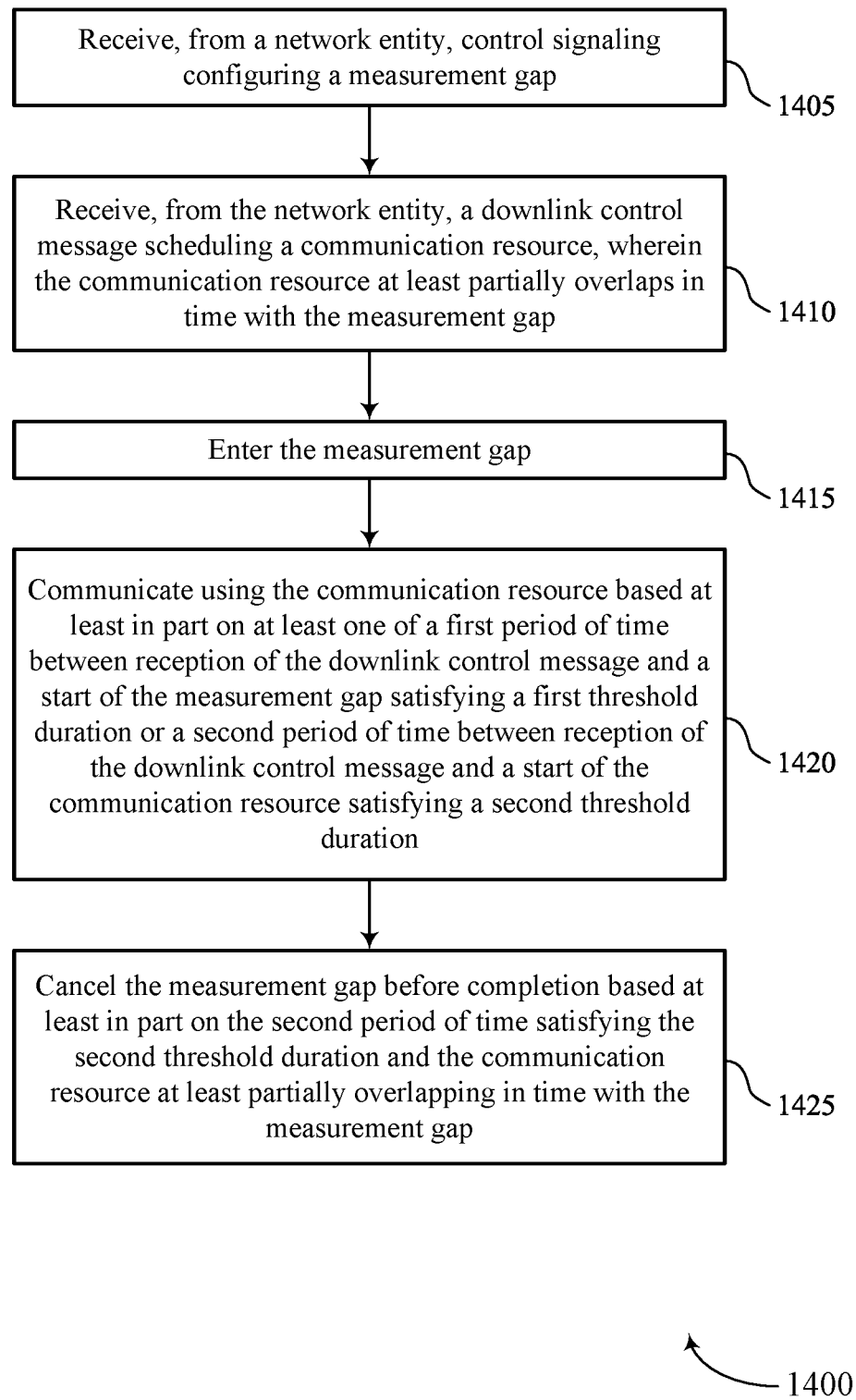

FIG. 14 shows a flowchart illustrating a method 1400 that supports handling of measurement gap collisions in accordance with one or more aspects of the present disclosure. The operations of the method 1400 may be implemented by a UE or components of the UE as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control signaling configuring a measurement gap. The operations of 1405 may be performed in accordance with examples as disclosed herein. In some examples, aspects of the operations of 1405 may be performed by a measurement gap configuration manager 1025 as described with reference to FIG. 10.

At 1410, the method may include receiving, from the network entity, a downlink control message scheduling a communication resource, where the communication resource at least partially overlaps in time with the measurement gap. The operations of 1410 may be performed in accordance with examples as disclosed herein. In some examples, aspects of the operations of 1410 may be performed by a communication resource manager 1030 as described with reference to FIG. 10.

At 1415, the method may include entering the measurement gap. The operations of 1415 may be performed in accordance with examples as disclosed herein. In some examples, aspects of the operations of 1415 may be performed by a measurement gap manager 1040 as described with reference to FIG. 10.

At 1420, the method may include communicating using the communication resource based on at least one of a first period of time between reception of the downlink control message and a start of the measurement gap satisfying a first threshold duration or a second period of time between reception of the downlink control message and a start of the communication resource satisfying a second threshold duration. The operations of 1420 may be performed in accordance with examples as disclosed herein. In some examples, aspects of the operations of 1420 may be performed by a measurement gap collision manager 1035 as described with reference to FIG. 10.

At 1425, the method may include canceling the measurement gap before completion based on the second period of time satisfying the second threshold duration and the communication resource at least partially overlapping in time with the measurement gap. The operations of 1425 may be performed in accordance with examples as disclosed herein. In some examples, aspects of the operations of 1425 may be performed by a measurement gap collision manager 1035 as described with reference to FIG. 10.

Figure 15:
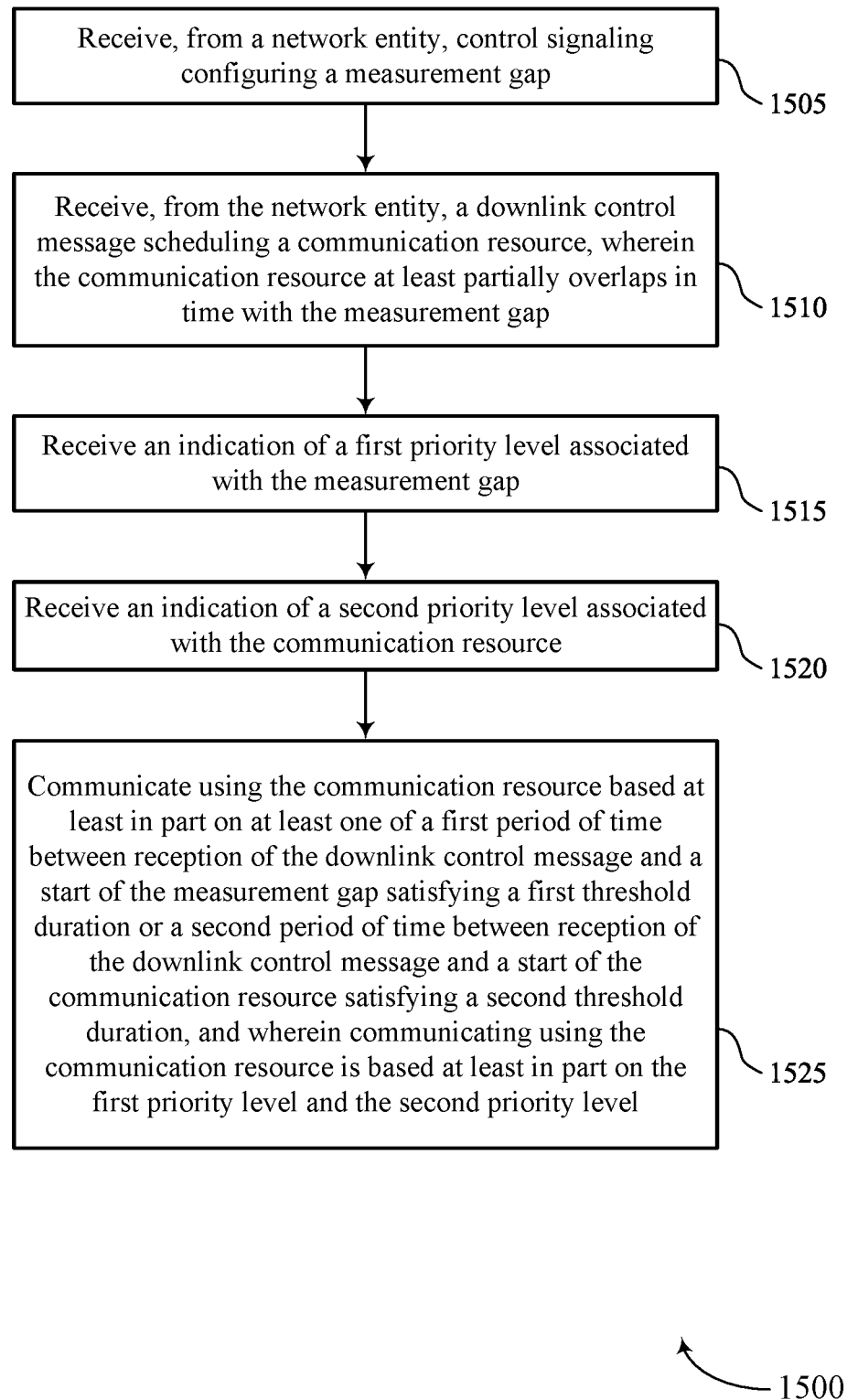

FIG. 15 shows a flowchart illustrating a method 1500 that supports handling of measurement gap collisions in accordance with one or more aspects of the present disclosure. The operations of the method 1500 may be implemented by a UE or components of the UE as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, control signaling configuring a measurement gap. The operations of 1505 may be performed in accordance with examples as disclosed herein. In some examples, aspects of the operations of 1505 may be performed by a measurement gap configuration manager 1025 as described with reference to FIG. 10.

At 1510, the method may include receiving, from the network entity, a downlink control message scheduling a communication resource, where the communication resource at least partially overlaps in time with the measurement gap. The operations of 1510 may be performed in accordance with examples as disclosed herein. In some examples, aspects of the operations of 1510 may be performed by a communication resource manager 1030 as described with reference to FIG. 10.

At 1515, the method may include receiving an indication of a first priority level associated with the measurement gap. The operations of 1515 may be performed in accordance with examples as disclosed herein. In some examples, aspects of the operations of 1515 may be performed by a priority level manager 1050 as described with reference to FIG. 10.

At 1520, the method may include receiving an indication of a second priority level associated with the communication resource. The operations of 1520 may be performed in accordance with examples as disclosed herein. In some examples, aspects of the operations of 1520 may be performed by a priority level manager 1050 as described with reference to FIG. 10.

At 1525, the method may include communicating using the communication resource based on at least one of a first period of time between reception of the downlink control message and a start of the measurement gap satisfying a first threshold duration or a second period of time between reception of the downlink control message and a start of the communication resource satisfying a second threshold duration, and where communicating using the communication resource is based at least in part on the first priority level and the second priority level. The operations of 1525 may be performed in accordance with examples as disclosed herein. In some examples, aspects of the operations of 1525 may be performed by a measurement gap collision manager 1035 as described with reference to FIG. 10.

Figure 16:
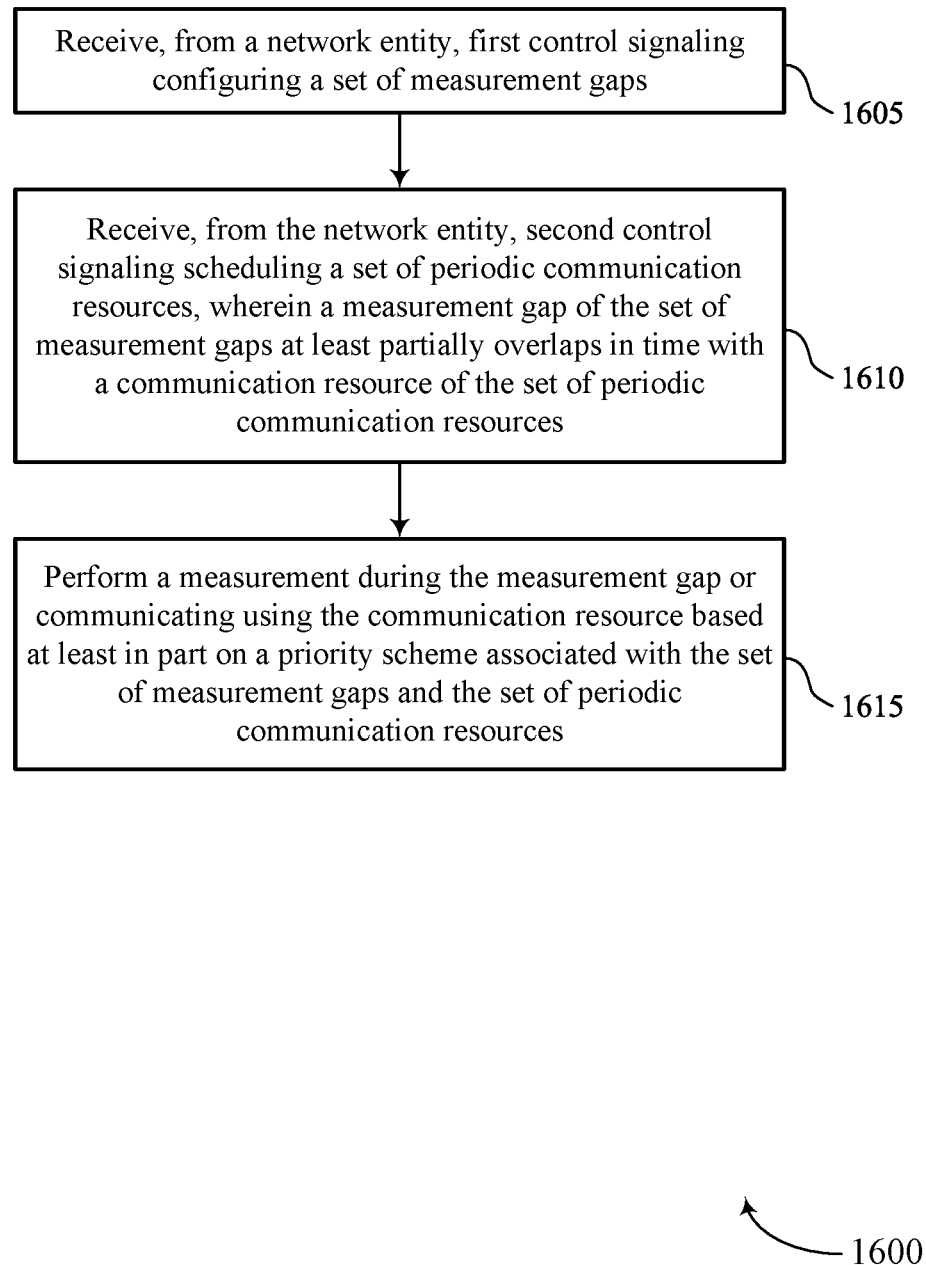

FIG. 16 shows a flowchart illustrating a method 1600 that supports handling of measurement gap collisions in accordance with one or more aspects of the present disclosure. The operations of the method 1600 may be implemented by a UE or components of the UE as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, first control signaling configuring a set of measurement gaps. The operations of 1605 may be performed in accordance with examples as disclosed herein. In some examples, aspects of the operations of 1605 may be performed by a measurement gap configuration manager 1025 as described with reference to FIG. 10.

At 1610, the method may include receiving, from the network entity, second control signaling scheduling a set of periodic communication resources, where a measurement gap of the set of measurement gaps at least partially overlaps in time with a communication resource of the set of periodic communication resources. The operations of 1610 may be performed in accordance with examples as disclosed herein. In some examples, aspects of the operations of 1610 may be performed by a communication resource manager 1030 as described with reference to FIG. 10.

At 1615, the method may include performing a measurement during the measurement gap or communicating using the communication resource based on a priority scheme associated with the set of measurement gaps and the set of periodic communication resources. The operations of 1615 may be performed in accordance with examples as disclosed herein. In some examples, aspects of the operations of 1615 may be performed by a measurement gap collision manager 1035 as described with reference to FIG. 10.

Figure 17:
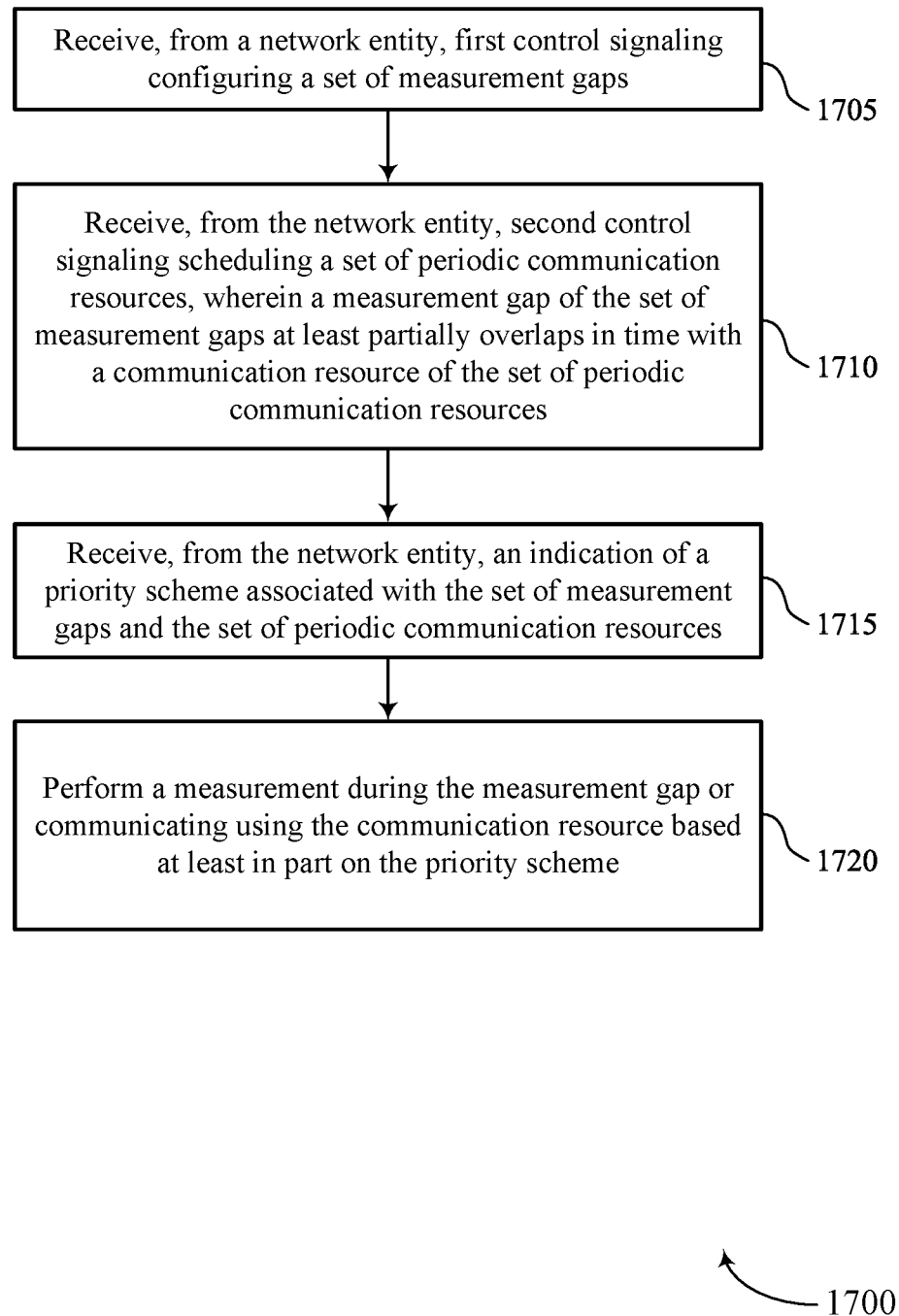

FIG. 17 shows a flowchart illustrating a method 1700 that supports handling of measurement gap collisions in accordance with one or more aspects of the present disclosure. The operations of the method 1700 may be implemented by a UE or components of the UE as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, first control signaling configuring a set of measurement gaps. The operations of 1705 may be performed in accordance with examples as disclosed herein. In some examples, aspects of the operations of 1705 may be performed by a measurement gap configuration manager 1025 as described with reference to FIG. 10.

At 1710, the method may include receiving, from the network entity, second control signaling scheduling a set of periodic communication resources, where a measurement gap of the set of measurement gaps at least partially overlaps in time with a communication resource of the set of periodic communication resources. The operations of 1710 may be performed in accordance with examples as disclosed herein. In some examples, aspects of the operations of 1710 may be performed by a communication resource manager 1030 as described with reference to FIG. 10.

At 1715, the method may include receiving, from the network entity, an indication of a priority scheme associated with the set of measurement gaps and the set of periodic communication resources. The operations of 1715 may be performed in accordance with examples as disclosed herein. In some examples, aspects of the operations of 1715 may be performed by a priority level manager 1050 as described with reference to FIG. 10.

At 1720, the method may include performing a measurement during the measurement gap or communicating using the communication resource based on the priority scheme. The operations of 1720 may be performed in accordance with examples as disclosed herein. In some examples, aspects of the operations of 1720 may be performed by a measurement gap collision manager 1035 as described with reference to FIG. 10.

Figure 18:
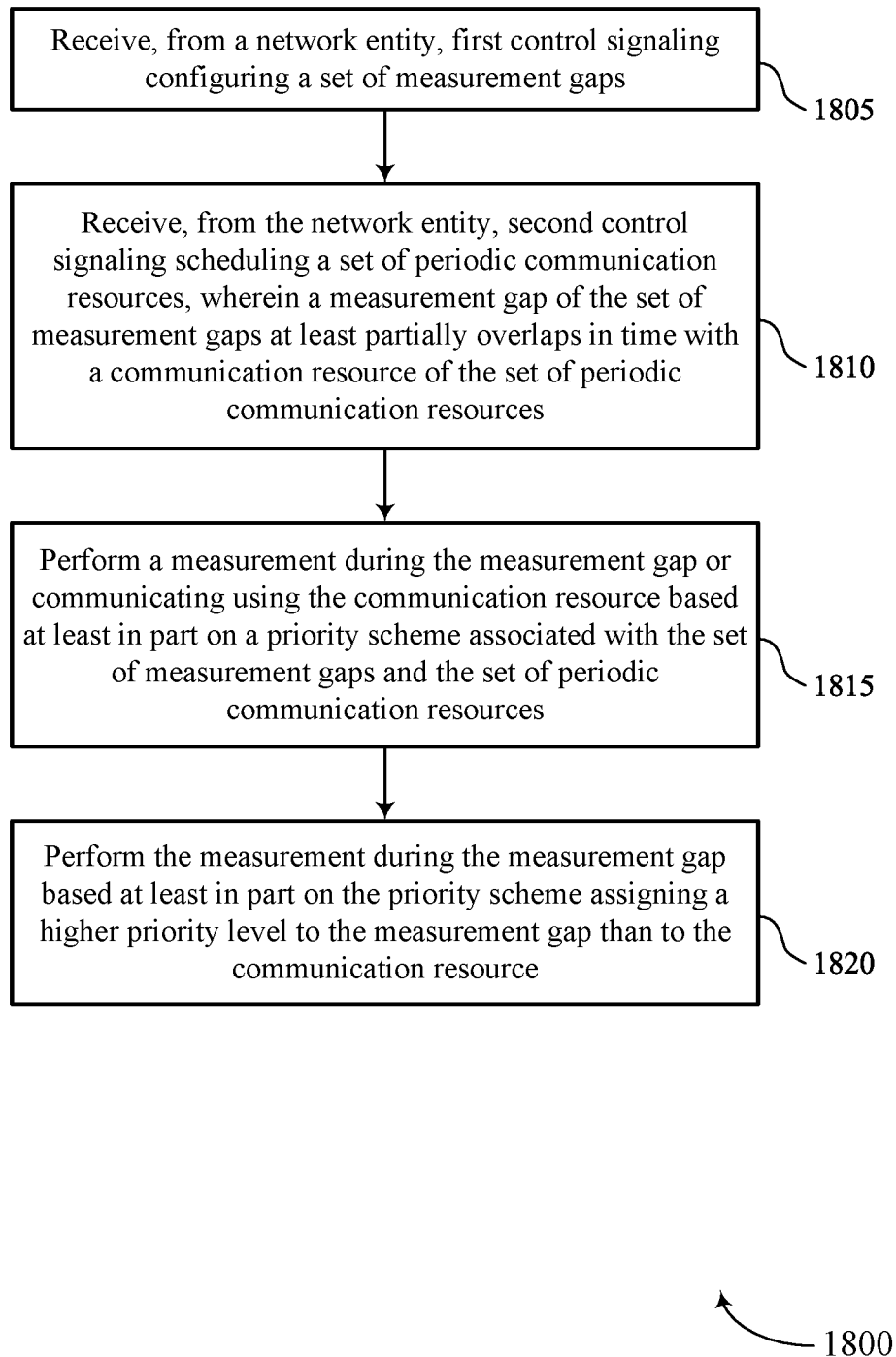

FIG. 18 shows a flowchart illustrating a method 1800 that supports handling of measurement gap collisions in accordance with one or more aspects of the present disclosure. The operations of the method 1800 may be implemented by a UE or components of the UE as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, first control signaling configuring a set of measurement gaps. The operations of 1805 may be performed in accordance with examples as disclosed herein. In some examples, aspects of the operations of 1805 may be performed by a measurement gap configuration manager 1025 as described with reference to FIG. 10.

At 1810, the method may include receiving, from the network entity, second control signaling scheduling a set of periodic communication resources, where a measurement gap of the set of measurement gaps at least partially overlaps in time with a communication resource of the set of periodic communication resources. The operations of 1810 may be performed in accordance with examples as disclosed herein. In some examples, aspects of the operations of 1810 may be performed by a communication resource manager 1030 as described with reference to FIG. 10.

At 1815, the method may include performing a measurement during the measurement gap or communicating using the communication resource based on a priority scheme associated with the set of measurement gaps and the set of periodic communication resources. The operations of 1815 may be performed in accordance with examples as disclosed herein. In some examples, aspects of the operations of 1815 may be performed by a measurement gap collision manager 1035 as described with reference to FIG. 10.

At 1820, the method may include performing the measurement during the measurement gap based on the priority scheme assigning a higher priority level to the measurement gap than to the communication resource. The operations of 1820 may be performed in accordance with examples as disclosed herein. In some examples, aspects of the operations of 1820 may be performed by a measurement gap manager 1040 as described with reference to FIG. 10.

Figure 19:
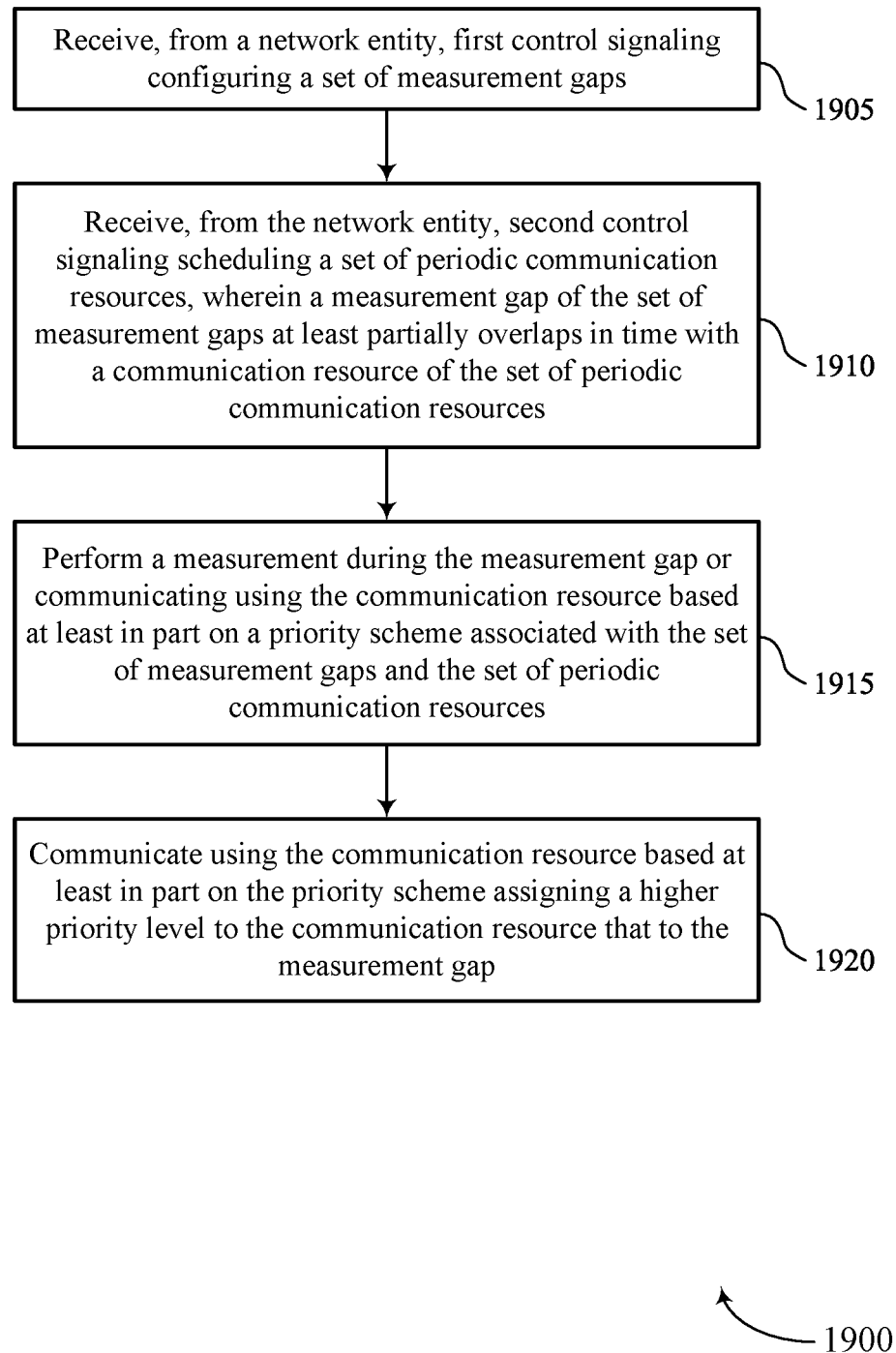

FIG. 19 shows a flowchart illustrating a method 1900 that supports handling of measurement gap collisions in accordance with one or more aspects of the present disclosure. The operations of the method 1900 may be implemented by a UE or components of the UE as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving, from a network entity, first control signaling configuring a set of measurement gaps. The operations of 1905 may be performed in accordance with examples as disclosed herein. In some examples, aspects of the operations of 1905 may be performed by a measurement gap configuration manager 1025 as described with reference to FIG. 10.

At 1910, the method may include receiving, from the network entity, second control signaling scheduling a set of periodic communication resources, where a measurement gap of the set of measurement gaps at least partially overlaps in time with a communication resource of the set of periodic communication resources. The operations of 1910 may be performed in accordance with examples as disclosed herein. In some examples, aspects of the operations of 1910 may be performed by a communication resource manager 1030 as described with reference to FIG. 10.

At 1915, the method may include performing a measurement during the measurement gap or communicating using the communication resource based on a priority scheme associated with the set of measurement gaps and the set of periodic communication resources. The operations of 1915 may be performed in accordance with examples as disclosed herein. In some examples, aspects of the operations of 1915 may be performed by a measurement gap collision manager 1035 as described with reference to FIG. 10.

At 1920, the method may include communicating using the communication resource based on the priority scheme assigning a higher priority level to the communication resource that to the measurement gap. The operations of 1920 may be performed in accordance with examples as disclosed herein. In some examples, aspects of the operations of 1920 may be performed by a communication manager 1055 as described with reference to FIG. 10.

The following provides an overview of aspects of the present disclosure:

Aspect 1: A method for wireless communications at a UE, comprising: receiving, from a network entity, control signaling configuring a measurement gap; receiving, from the network entity, a downlink control message scheduling a communication resource, wherein the communication resource at least partially overlaps in time with the measurement gap; and communicating using the communication resource based at least in part on at least one of a first period of time between reception of the downlink control message and a start of the measurement gap satisfying a first threshold duration or a second period of time between reception of the downlink control message and a start of the communication resource satisfying a second threshold duration.

Aspect 2: The method of aspect 1, wherein communicating using the communication resource is based at least in part on the first period of time satisfying the first threshold duration.

Aspect 3: The method of any of aspects 1 through 2, further comprising: skipping an entirety of the measurement gap based at least in part on the first period of time satisfying the first threshold duration and the communication resource at least partially overlapping in time with the measurement gap.

Aspect 4: The method of any of aspects 1 through 3, wherein communicating using the communication resource is based at least in part on the second period of time satisfying the second threshold duration.

Aspect 5: The method of any of aspects 1 through 4, further comprising: entering the measurement gap; and canceling the measurement gap before completion based at least in part on the second period of time satisfying the second threshold duration and the communication resource at least partially overlapping in time with the measurement gap.

Aspect 6: The method of any of aspects 1 through 5, further comprising: transmitting, to the network entity, one of a capability message or a UE assistance information message indicating at least one of a first target time between associated downlink control messages and measurement gaps for the UE or a second target time between associated downlink control messages and downlink communication resources for the UE.

Aspect 7: The method of aspect 6, further comprising: receiving, from the network entity, second control signaling indicating at least one of the first threshold duration or the second threshold duration, wherein the second control signaling is based at least in part on capability message or the UE assistance information message.

Aspect 8: The method of any of aspects 1 through 7, further comprising: receiving an indication of a first priority level associated with the measurement gap; and receiving an indication of a second priority level associated with the communication resource, and wherein communicating using the communication resource is based at least in part on the first priority level and the second priority level.

Aspect 9: The method of aspect 8, further comprising: receiving the indication of the first priority level via the control signaling.

Aspect 10: The method of any of aspects 8 through 9, further comprising: receiving the indication of the second priority level via the downlink control message.

Aspect 11: The method of any of aspects 8 through 10, further comprising: receiving, with the control signaling, an indication of a measurement associated with the measurement gap, wherein the first priority level is based at least in part on the measurement.

Aspect 12: The method of any of aspects 8 through 11, wherein the second priority level is based at least in part on a communication resource type of the communication resource.

Aspect 13: The method of any of aspects 1 through 12, wherein the downlink control message is received via a first component carrier and the communication resource is associated with a second component carrier, and the downlink control message does not overlap or at least partially overlaps in time with the measurement gap.

Aspect 14: The method of any of aspects 1 through 13, wherein the downlink control message is received via a component carrier and the communication resource is associated with the component carrier, and communicating using the communication resource based at least in part on receiving the downlink control message before the measurement gap.

Aspect 15: The method of any of aspects 1 through 14, wherein the communication resource is a downlink communication resource, and at least one of the first threshold duration or the second threshold duration is based at least in part on at least one of a first target time between associated downlink control messages and measurement gaps for the UE or a second target time between associated downlink control messages and downlink communication resources for the UE.

Aspect 16: The method of any of aspects 1 through 15, wherein the communication resource is a downlink communication resource, and the second threshold duration is based at least in part on a duration for the UE to tune radio frequency circuitry of the UE from the measurement gap to a bandwidth part associated with the downlink communication resource.

Aspect 17: The method of any of aspects 1 through 16, wherein the communication resource is an uplink communication resource, and at least one of the first threshold duration or the second threshold duration is based at least in part on at least one of a first target time between associated downlink control messages and measurement gaps for the UE or a second target duration between associated downlink control messages and uplink communication resources for the UE.

Aspect 18: The method of aspect 17, wherein the communication resource is an uplink communication resource, and the first threshold duration or the second threshold duration is based at least in part on a downlink control message processing time capability of the UE and an uplink shared channel message preparation time capability of the UE.

Aspect 19: The method of any of aspects 17 through 18, wherein the second threshold duration is based at least in part on a duration for the UE to tune radio frequency circuitry of the UE from the measurement gap to a bandwidth part associated with the uplink communication resource.

Aspect 20: A method for wireless communications at a UE, comprising: receiving, from a network entity, first control signaling configuring a set of measurement gaps; receiving, from the network entity, second control signaling scheduling a set of periodic communication resources, wherein a measurement gap of the set of measurement gaps at least partially overlaps in time with a communication resource of the set of periodic communication resources; and performing a measurement during the measurement gap or communicating using the communication resource based at least in part on a priority scheme associated with the set of measurement gaps and the set of periodic communication resources.

Aspect 21: The method of aspect 20, further comprising: receiving, from the network entity, an indication of the priority scheme.

Aspect 22: The method of any of aspects 20 through 21, further comprising: performing the measurement during the measurement gap based at least in part on the priority scheme assigning a higher priority level to the measurement gap than to the communication resource.

Aspect 23: The method of any of aspects 20 through 22, further comprising: communicating using the communication resource based at least in part on the priority scheme assigning a higher priority level to the communication resource that to the measurement gap.

Aspect 24: The method of any of aspects 20 through 23, wherein a priority level associated with the measurement gap is based at least in part on a position of the measurement gap within the set of measurement gaps, and the priority scheme is based at least in part on the priority level.

Aspect 25: The method of any of aspects 20 through 24, further comprising: receiving, with the second control signaling, an indication of a priority level associated with the set of periodic communication resources, wherein the priority scheme is based at least in part on the priority level.

Aspect 26: The method of any of aspects 20 through 25, wherein a priority level associated with the set of periodic communication resources is based at least in part on a communication resource type of the set of periodic communication resources, and the priority scheme is based at least in part on the priority level.

Aspect 27: The method of any of aspects 20 through 26, further comprising: receiving, from the network entity, a downlink control message scheduling the communication resource, wherein the downlink control message indicates a priority level associated with the communication resource, and wherein the priority scheme is based at least in part on the priority level.

Aspect 28: The method of any of aspects 20 through 27, further comprising: receiving, with the first control signaling, an indication of the measurement associated with the measurement gap of the set of measurement gaps, wherein a priority level associated with the measurement gap is based at least in part on the measurement, and wherein the priority scheme is based at least in part on the priority level.

Aspect 29: An apparatus for wireless communications at a UE, comprising a processor; memory coupled with the processor; and instructions stored in the memory and executable by the processor to cause the apparatus to perform a method of any of aspects 1 through 19.

Aspect 30: An apparatus for wireless communications at a UE, comprising at least one means for performing a method of any of aspects 1 through 19.

Aspect 31: A non-transitory computer-readable medium storing code for wireless communications at a UE, the code comprising instructions executable by a processor to perform a method of any of aspects 1 through 19.

Aspect 32: An apparatus for wireless communications, comprising a processor; memory coupled with the processor; and instructions stored in the memory and executable by the processor to cause the apparatus to perform a method of any of aspects 20 through 28.

Aspect 33: An apparatus for wireless communications, comprising at least one means for performing a method of any of aspects 20 through 28.

Aspect 34: A non-transitory computer-readable medium storing code for wireless communications, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors, and
   instructions stored in the one or more memories and executable by the one or more processors to cause the apparatus to:
     receive, from a network entity, control signaling configuring a measurement gap;
     receive, from the network entity, a downlink control message scheduling a communication resource, wherein the communication resource at least partially overlaps in time with the measurement gap;
     receive an indication of a first priority level associated with the measurement gap;
     receive an indication of a second priority level associated with the communication resource; and
     communicate using the communication resource based at least in part on at least one of a first period of time between reception of the downlink control message and a start of the measurement gap satisfying a first threshold duration or a second period of time between reception of the downlink control message and a start of the communication resource satisfying a second threshold duration,
     wherein the instructions are executable by the one or more processors to cause the apparatus to communicate using the communication resource based at least in part on the first priority level and the second priority level.

2. The apparatus of claim 1, wherein the instructions are executable by the one or more processors to cause the apparatus to communicate using the communication resource based at least in part on the first period of time satisfying the first threshold duration.

3. The apparatus of claim 1, wherein the instructions are further executable by the one or more processors to cause the apparatus to:
   skip an entirety of the measurement gap based at least in part on the first period of time satisfying the first threshold duration and the communication resource at least partially overlapping in time with the measurement gap.

4. The apparatus of claim 1, wherein the instructions are executable by the one or more processors to cause the apparatus to communicate using the communication resource based at least in part on the second period of time satisfying the second threshold duration.

5. The apparatus of claim 1, wherein the instructions are further executable by the one or more processors to cause the apparatus to:
enter the measurement gap; and
cancel the measurement gap before completion based at least in part on the second period of time satisfying the second threshold duration and the communication resource at least partially overlapping in time with the measurement gap.

6. The apparatus of claim 1, wherein the instructions are further executable by the one or more processors to cause the apparatus to:
transmit, to the network entity, one of a capability message or a UE assistance information message indicating at least one of a first target time between associated downlink control messages and measurement gaps for the UE or a second target time between associated downlink control messages and downlink communication resources for the UE.

7. The apparatus of claim 6, wherein the instructions are further executable by the one or more processors to cause the apparatus to:
receive, from the network entity, second control signaling indicating at least one of the first threshold duration or the second threshold duration, wherein the second control signaling is based at least in part on the capability message or the UE assistance information message.

8. The apparatus of claim 1, wherein the instructions are further executable by the one or more processors to cause the apparatus to:
receive the indication of the first priority level via the control signaling.

9. The apparatus of claim 1, wherein the instructions are further executable by the one or more processors to cause the apparatus to:
receive the indication of the second priority level via the downlink control message.

10. The apparatus of claim 1, wherein the instructions are further executable by the one or more processors to cause the apparatus to:
receive, with the control signaling, an indication of a measurement associated with the measurement gap, wherein the first priority level is based at least in part on the measurement.

11. The apparatus of claim 1, wherein the second priority level is based at least in part on a communication resource type of the communication resource.

12. The apparatus of claim 1, wherein the instructions are executable by the one or more processors to cause the apparatus to receive the downlink control message via a first component carrier, wherein the communication resource is associated with a second component carrier, and wherein the downlink control message does not overlap or at least partially overlaps in time with the measurement gap.

13. The apparatus of claim 1, wherein the instructions are executable by the one or more processors to cause the apparatus to receive the downlink control message via a component carrier, and wherein and the communication resource is associated with the component carrier, and wherein the instructions are executable by the one or more processors to cause the apparatus to communicate using the communication resource based at least in part on receiving the downlink control message before the measurement gap.

14. The apparatus of claim 1, wherein:
the communication resource is a downlink communication resource, and
at least one of the first threshold duration or the second threshold duration is based at least in part on at least one of a first target time between associated downlink control messages and measurement gaps for the UE or a second target time between associated downlink control messages and downlink communication resources for the UE.

15. The apparatus of claim 1, wherein:
the communication resource is a downlink communication resource, and
the second threshold duration is based at least in part on a duration for the UE to tune radio frequency circuitry of the UE from the measurement gap to a bandwidth part associated with the downlink communication resource.

16. The apparatus of claim 1, wherein:
the communication resource is an uplink communication resource, and
at least one of the first threshold duration or the second threshold duration is based at least in part on at least one of a first target time between associated downlink control messages and measurement gaps for the UE or a second target duration between associated downlink control messages and uplink communication resources for the UE.

17. The apparatus of claim 16, wherein the first threshold duration or the second threshold duration is based at least in part on a downlink control message processing time capability of the UE and an uplink shared channel message preparation time capability of the UE.

18. The apparatus of claim 16, wherein the second threshold duration is based at least in part on a duration for the UE to tune radio frequency circuitry of the UE from the measurement gap to a bandwidth part associated with the uplink communication resource.

19. An apparatus for wireless communications at a user equipment (UE), comprising:
one or more processors;
one or more memories coupled with the one or more processors; and
instructions stored in the one or more memories and executable by the one or more processors to cause the apparatus to:
receive, from a network entity, first control signaling configuring a set of measurement gaps;
receive, from the network entity, second control signaling scheduling a set of periodic communication resources, wherein a measurement gap of the set of measurement gaps at least partially overlaps in time with a communication resource of the set of periodic communication resources; and
perform a measurement during the measurement gap or communicate using the communication resource based at least in part on a priority scheme associated with the set of measurement gaps and the set of periodic communication resources.

20. The apparatus of claim 19, wherein the instructions are further executable by the one or more processors to cause the apparatus to:

receive, from the network entity, an indication of the priority scheme.

21. The apparatus of claim 19, wherein the instructions are further executable by the one or more processors to cause the apparatus to:
perform the measurement during the measurement gap based at least in part on the priority scheme assigning a higher priority level to the measurement gap than to the communication resource.

22. The apparatus of claim 19, wherein the instructions are further executable by the one or more processors-to cause the apparatus to:
communicate using the communication resource based at least in part on the priority scheme assigning a higher priority level to the communication resource that to the measurement gap.

23. The apparatus of claim 19, wherein:
a priority level associated with the measurement gap is based at least in part on a position of the measurement gap within the set of measurement gaps, and
the priority scheme is based at least in part on the priority level.

24. The apparatus of claim 19, wherein the instructions are further executable by the one or more processors to cause the apparatus to:
receive, with the second control signaling, an indication of a priority level associated with the set of periodic communication resources, wherein the priority scheme is based at least in part on the priority level.

25. The apparatus of claim 19, wherein:
a priority level associated with the set of periodic communication resources is based at least in part on a communication resource type of the set of periodic communication resources, and
the priority scheme is based at least in part on the priority level.

26. The apparatus of claim 19, wherein the instructions are further executable by the one or more processors to cause the apparatus to:
receive, from the network entity, a downlink control message scheduling the communication resource, wherein the downlink control message indicates a priority level associated with the communication resource, and wherein the priority scheme is based at least in part on the priority level.

27. The apparatus of claim 19, wherein the instructions are further executable by the one or more processors to cause the apparatus to:
receive, with the first control signaling, an indication of the measurement associated with the measurement gap of the set of measurement gaps, wherein a priority level associated with the measurement gap is based at least in part on the measurement, and wherein the priority scheme is based at least in part on the priority level.

28. A method for wireless communications at a user equipment (UE), comprising:
receiving, from a network entity, control signaling configuring a measurement gap;
receiving, from the network entity, a downlink control message scheduling a communication resource, wherein the communication resource at least partially overlaps in time with the measurement gap;
receiving an indication of a first priority level associated with the measurement gap;
receiving an indication of a second priority level associated with the communication resource; and
communicating using the communication resource based at least in part on at least one of a first period of time between reception of the downlink control message and a start of the measurement gap satisfying a first threshold duration or a second period of time between reception of the downlink control message and a start of the communication resource satisfying a second threshold duration,
wherein the communicating using the communication resource is based at least in part on the first priority level and the second priority level.

29. A method for wireless communications at a user equipment (UE), comprising:
receiving, from a network entity, first control signaling configuring a set of measurement gaps;
receiving, from the network entity, second control signaling scheduling a set of periodic communication resources, wherein a measurement gap of the set of measurement gaps at least partially overlaps in time with a communication resource of the set of periodic communication resources; and
performing a measurement during the measurement gap or communicating using the communication resource based at least in part on a priority scheme associated with the set of measurement gaps and the set of periodic communication resources.

* * * * *